United States Patent [19]

Miyazawa

[11] Patent Number: 5,497,449
[45] Date of Patent: Mar. 5, 1996

[54] FUZZY INFERENCE APPARATUS

[75] Inventor: Azuma Miyazawa, Tokyo, Japan

[73] Assignee: Olympus Optical Co., Ltd., Tokyo, Japan

[21] Appl. No.: 124,385

[22] Filed: Sep. 20, 1993

Related U.S. Application Data

[63] Continuation of Ser. No. 793,620, Nov. 18, 1991, abandoned.

[30] Foreign Application Priority Data

Nov. 30, 1990 [JP] Japan ..................... 2-340932

[51] Int. Cl.⁶ ........................................ G06G 7/00
[52] U.S. Cl. ................. 395/61; 395/3; 395/900; 395/10
[58] Field of Search ................... 395/3, 10, 900, 395/61; 364/513; 355/208, 508

[56] References Cited

U.S. PATENT DOCUMENTS

| | | | |
|---|---|---|---|
| 5,012,430 | 4/1991 | Sakurai | 364/513 |
| 5,029,314 | 7/1991 | Katsumi et al. | 355/208 |
| 5,131,071 | 7/1992 | Tsutsumi et al. | 395/3 |
| 5,134,568 | 7/1992 | Sainen | 395/900 |
| 5,135,688 | 8/1992 | Nakamura et al. | 395/900 |
| 5,185,849 | 2/1993 | Miyazawa et al. | 395/3 |
| 5,202,954 | 4/1993 | Miyazawa et al. | 395/3 |
| 5,243,687 | 9/1993 | Ando et al. | 395/3 |
| 5,249,258 | 9/1993 | Hisano | 395/3 |
| 5,255,344 | 10/1993 | Takagi et al. | 395/3 |
| 5,263,125 | 11/1993 | Viut et al. | 395/3 |

FOREIGN PATENT DOCUMENTS

| | | |
|---|---|---|
| 0360256 | 9/1989 | European Pat. Off. . |
| 2-56602 | 2/1990 | Japan . |
| 2-93943 | 4/1990 | Japan . |

*Primary Examiner*—Allen R. MacDonald
*Assistant Examiner*—Tariq Hafiz
*Attorney, Agent, or Firm*—Frishauf, Holtz, Goodman & Woodward

[57] ABSTRACT

A fuzzy inference apparatus comprises a rule storing circuit for storing then-part positions respectively corresponding to first if-part membership functions and second if-part membership functions. The first and second if-part membership functions have shapes of triangles each having a base corresponding to positions of vertices of triangles of two adjacent membership functions. A rule selector sequentially compares an input value with positions of vertices representing the first if-part membership functions, retrieves two adjacent vertex positions between which a position of the input value is located, calculates first and second differences between the retrieved two vertex positions and the input value, sequentially compares an input value with positions of vertices representing the second if-part membership functions, retrieves two adjacent vertex positions between which a position of the input value is located, and calculates third and fourth differences between the retrieved two vertex positions and the input value. A membership value selector selects a minimum value of each rule on the basis of magnitudes of the first to fourth differences.

14 Claims, 30 Drawing Sheets

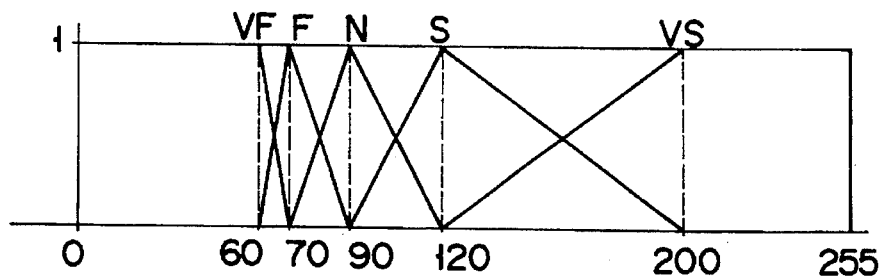
FIG. 2A
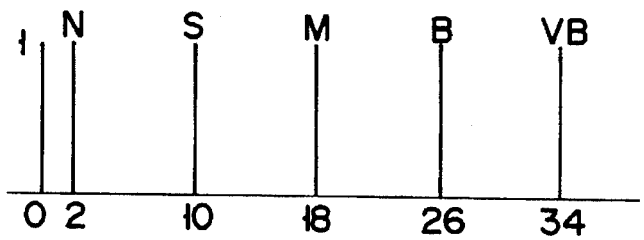
FIG. 2B
| PRESENT \ PREVIOUS | VF | F | N | S | VS |
|---|---|---|---|---|---|
| VF | VB | VB | | | |
| F | B | B | B(a) | | |
| N | | M | M | | |
| S | | | | S | |
| VS | | | | | N |
FIG. 3

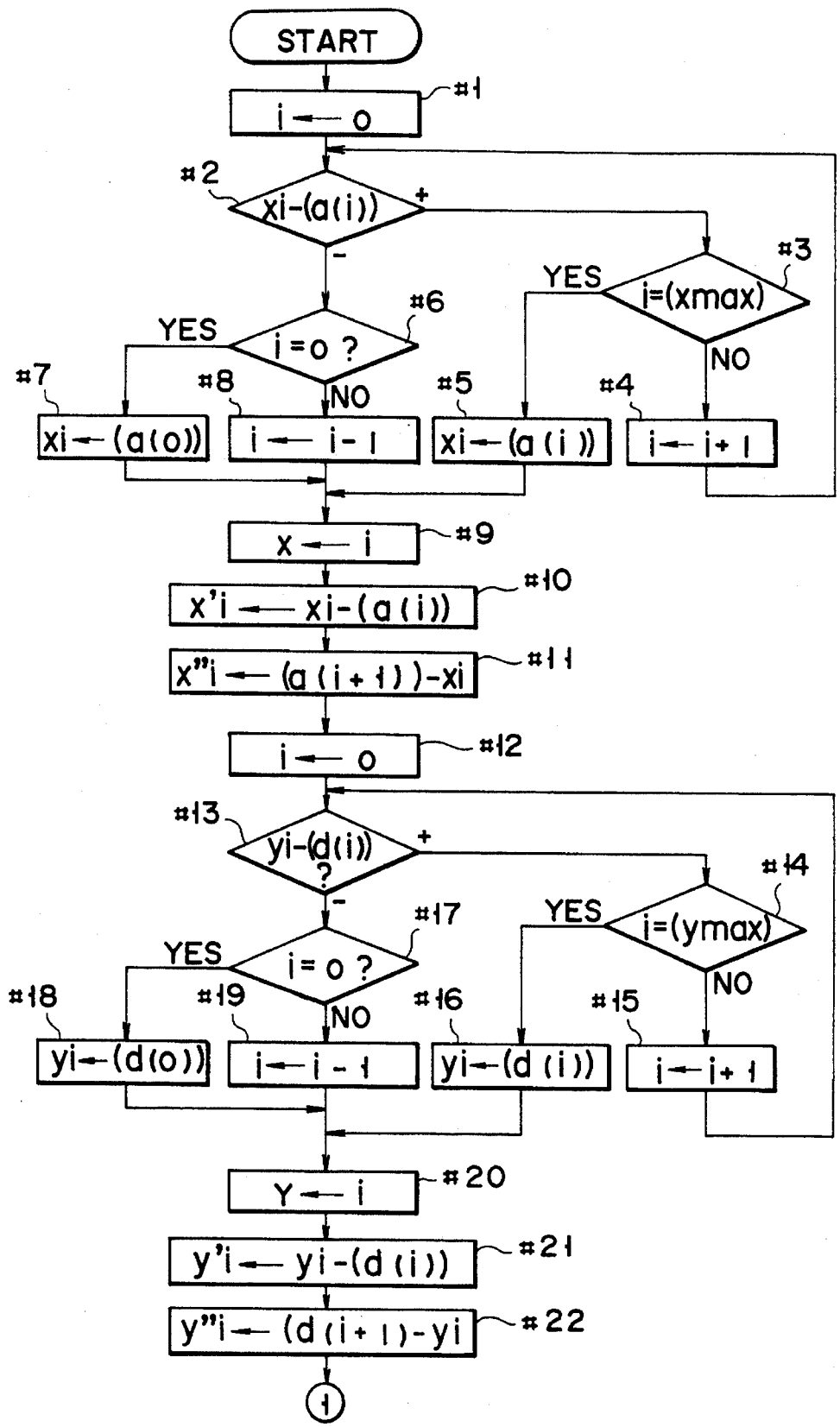
F I G. 7A

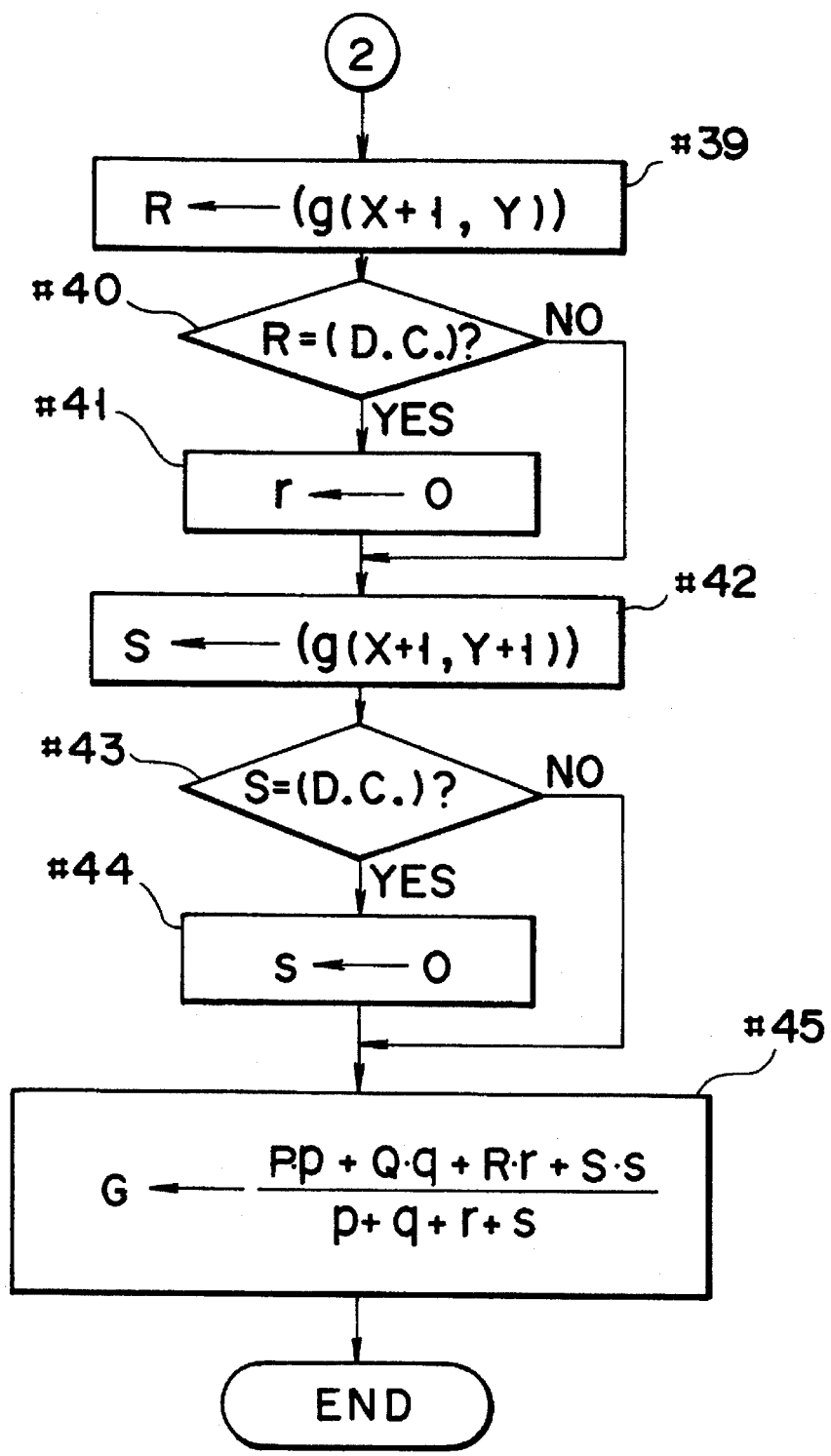
F I G. 7C

|   | a(0) | a(1) | a(2) | a(3) | a(4) |
|---|---|---|---|---|---|
| d(0) | g(0,0) | g(1,0) |   |   |   |
| d(1) | g(0,1) | g(1,1) | g(2,1) |   |   |
| d(2) |   | g(1,2) | g(2,2) |   |   |
| d(3) |   |   |   | g(3,3) |   |
| d(4) |   |   |   |   | g(4,4) |

F I G. 9

|   | a(0) | a(1) | a(2) | a(3) | a(4) |
|---|---|---|---|---|---|
| −1 |   | g(1,0) | g(2,1) |   |   |
| 0 | g(0,0) | g(1,1) | g(2,2) | g(3,3) | g(4,4) |
| +1 | g(0,1) | g(1,2) |   |   |   |

F I G. 10

|   | a(0) | a(1) | a(2) | a(3) | a(4) |
|---|---|---|---|---|---|
| e(0) | j(0,0) | j(1,0) | j(2,0) | j(3,0) | j(4,0) |
| e(1) | j(0,1) | j(1,1) | j(2,1) | j(3,1) | j(4,1) |
| e(2) | j(0,2) | j(1,2) | j(2,2) | j(3,2) | j(4,2) |

F I G. 11

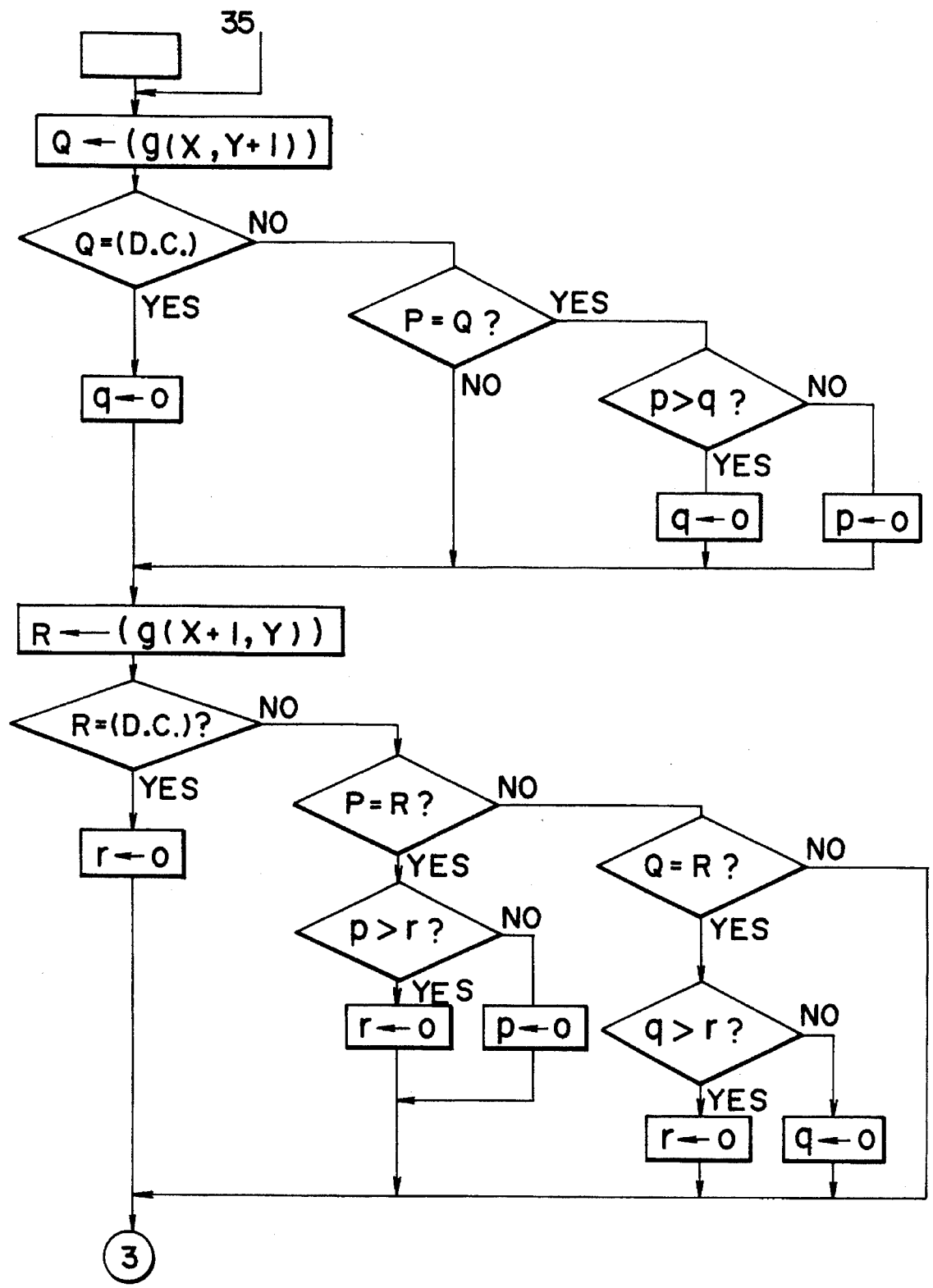
F I G. 12A

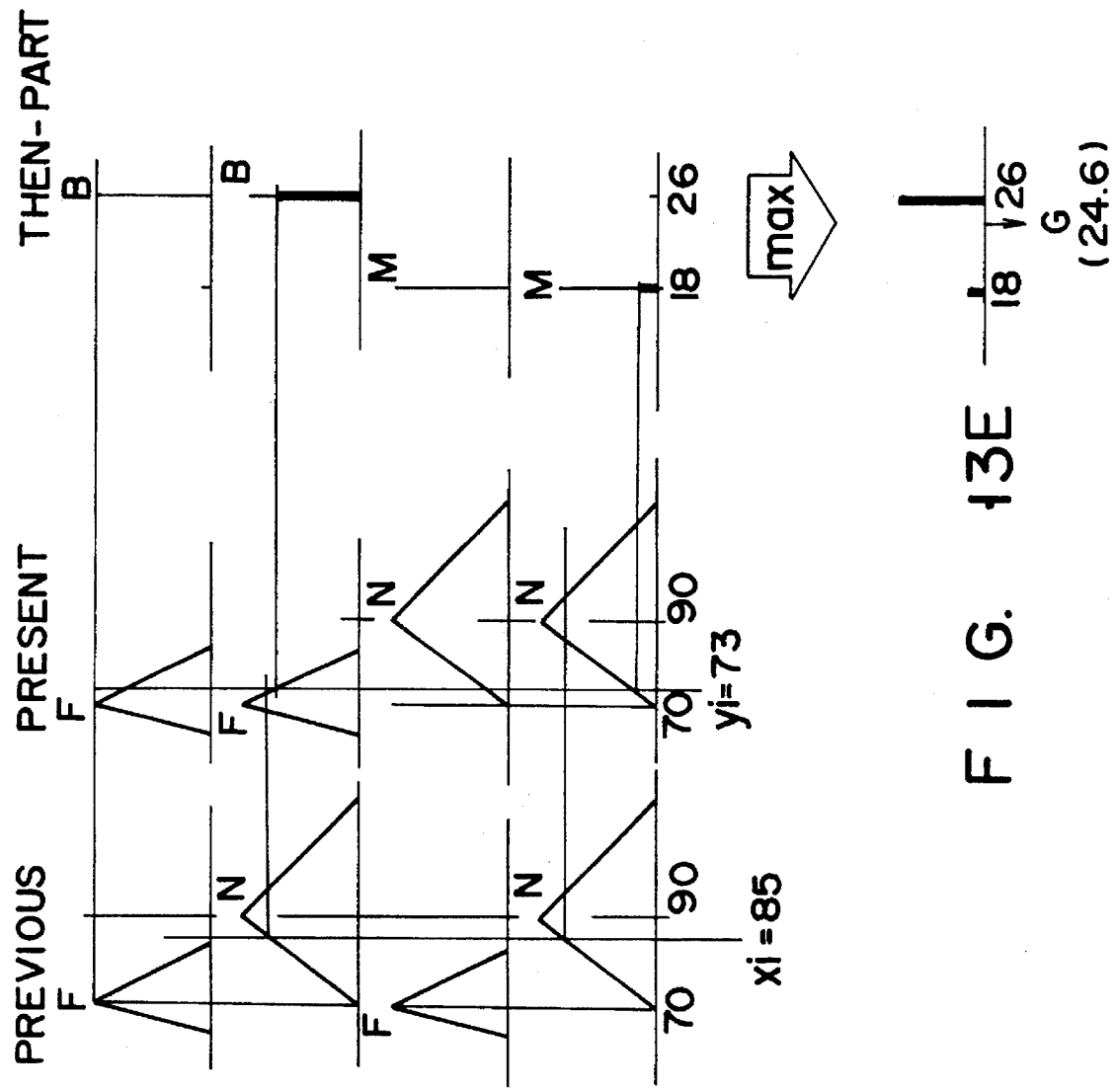

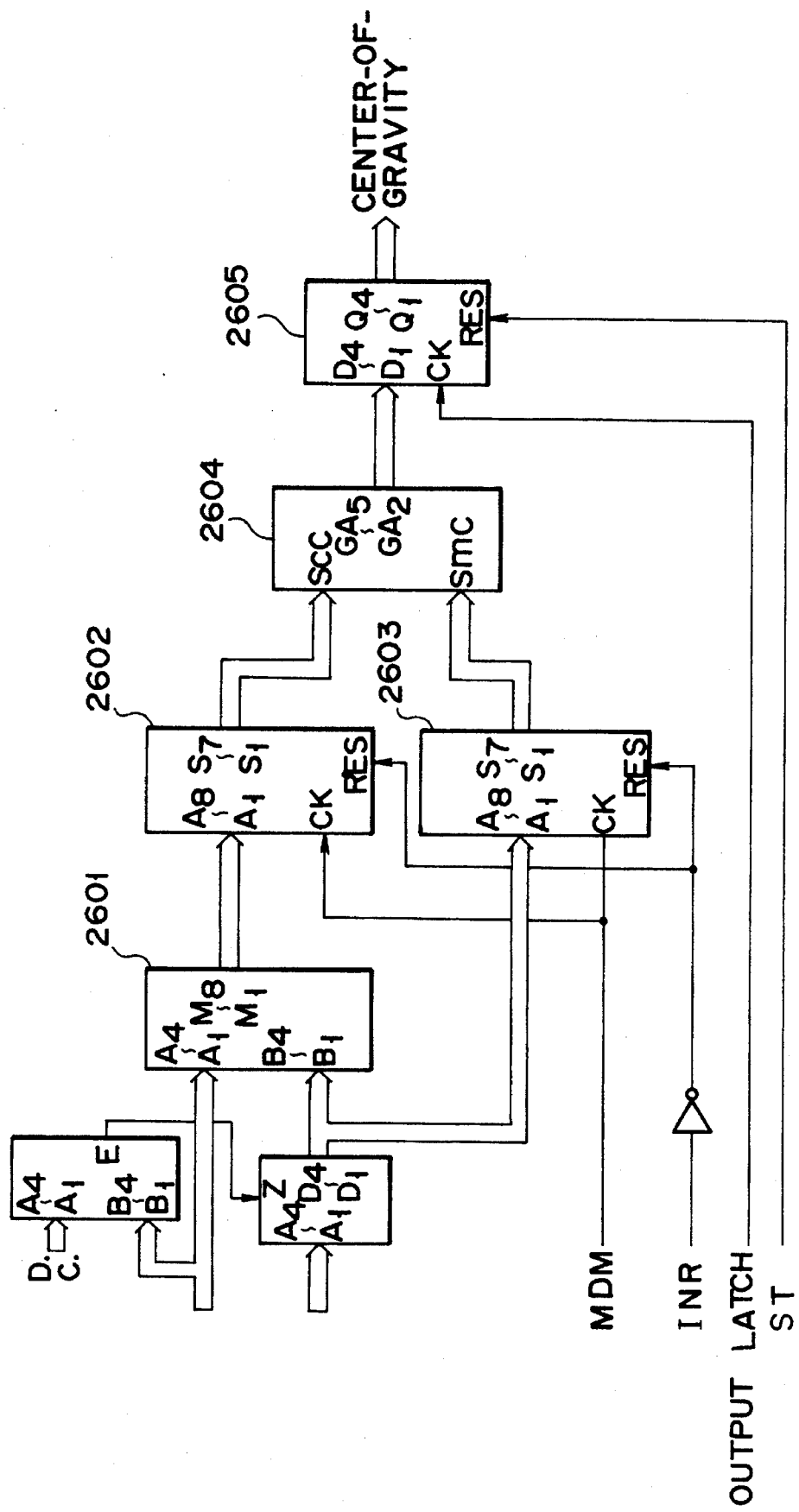
F I G. 20

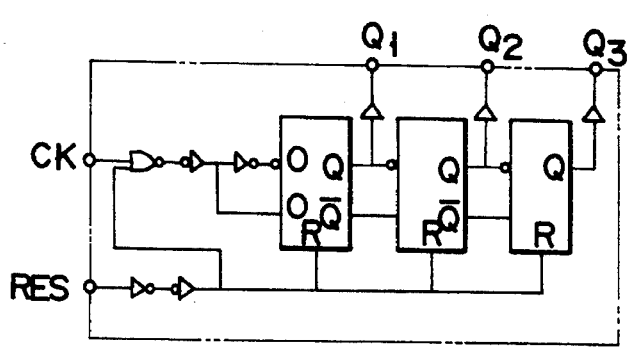
F I G. 25A    F I G. 25B
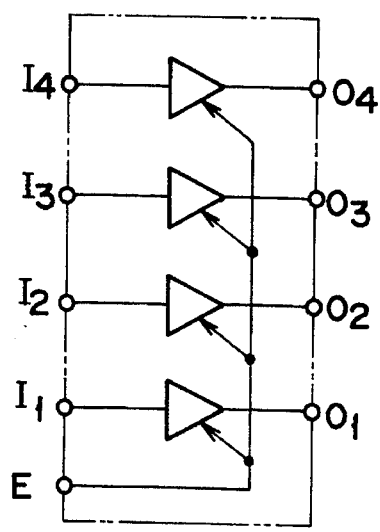
F I G. 26A    F I G. 26B

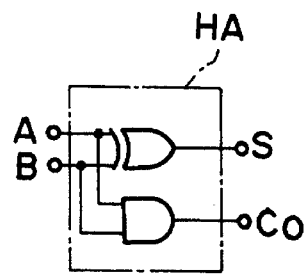
FIG. 27A
| INPUT | | OUTPUT | |
|---|---|---|---|
| B | A | Co | S |
| 0 | 0 | 0 | 0 |
| 0 | 1 | 0 | 1 |
| 1 | 0 | 0 | 1 |
| 1 | 1 | 1 | 0 |
FIG. 27B
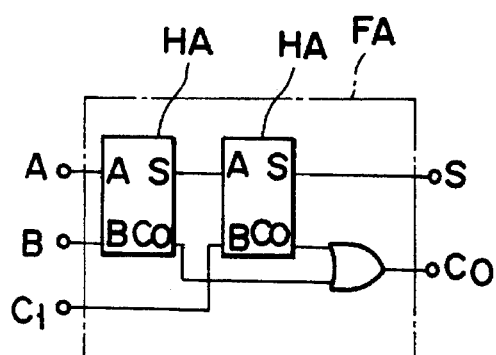
FIG. 28A
| INPUT | | | OUTPUT | |
|---|---|---|---|---|
| $C_i$ | B | A | $C_o$ | S |
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 1 |
FIG. 28B

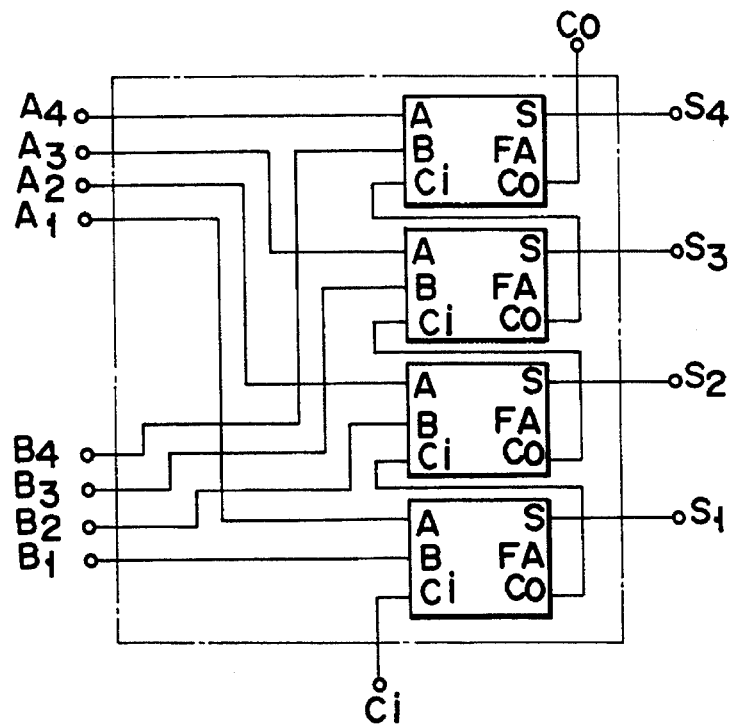
F I G. 29
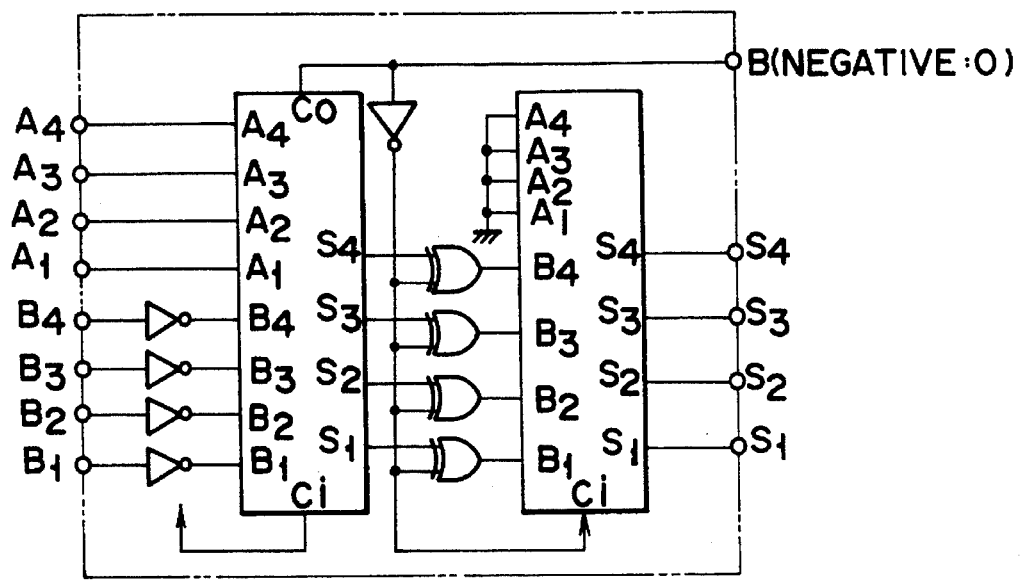
F I G. 30

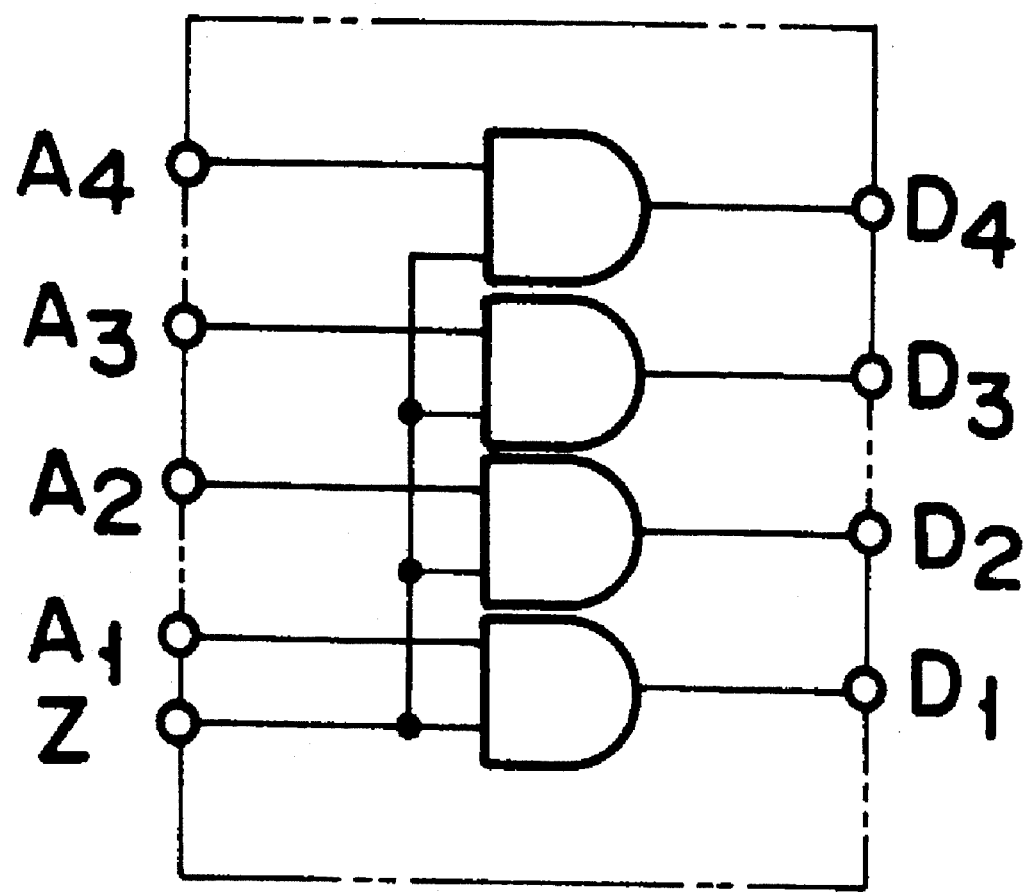
F I G. 31

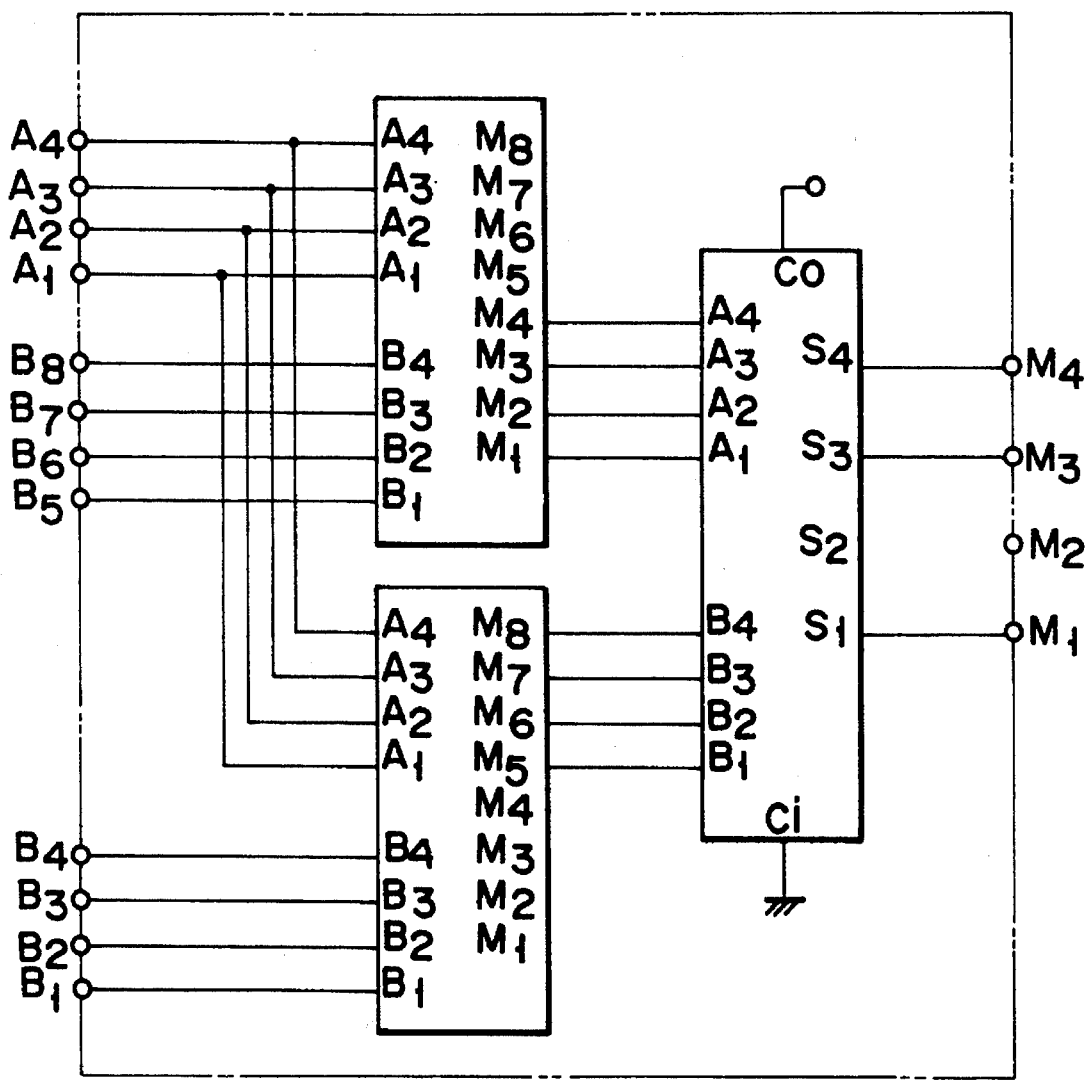
F I G. 33

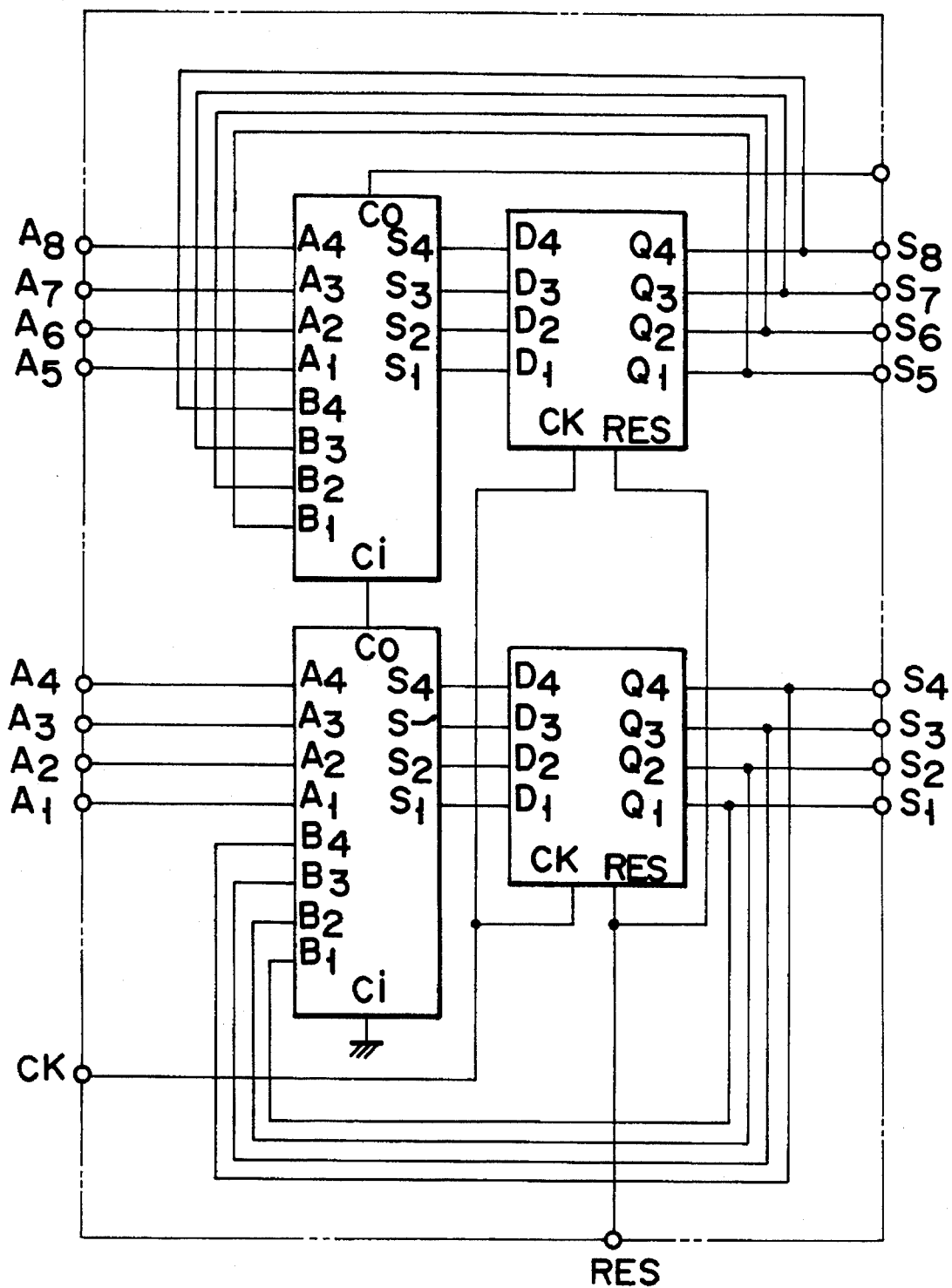
F I G. 34

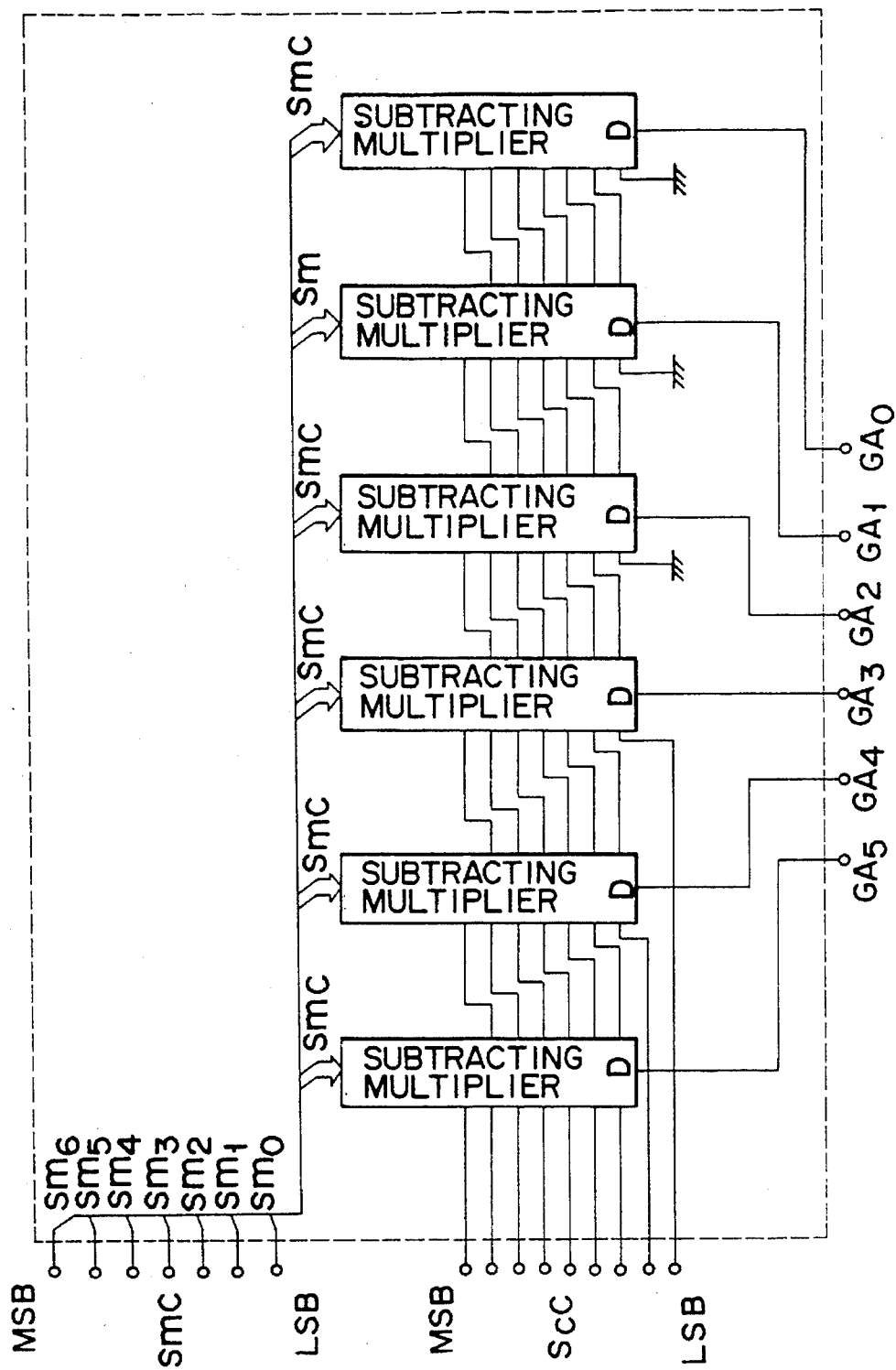
F I G. 35

FUZZY INFERENCE APPARATUS

This application is a continuation of application Ser. No. 07/793,620, filed Nov. 18, 1991 now abandoned.

BACKGROUND OF THE INVENTION

1. Field of the Invention

The present invention relates to a fuzzy inference apparatus and, more particularly, to a control fuzzy inference apparatus.

2. Description of the Related Art

In industrial applications of fuzzy inference apparatuses as control fuzzy inference apparatuses, a high inference speed and a simple arrangement for facilitating product assembly are desirable.

A technique for storing all inference results in a memory and looking up a look-up table using input values as addresses is an example of a system having a high inference speed. This technique is disclosed in Published Unexamined Japanese Patent Application No. 2-56602.

A technique for selecting the position of an if-part membership function by an upper bit of an input and using its lower bit to indicate the goodness of fit is an example of a system having a simple arrangement. This technique is disclosed in Published Unexamined Japanese Patent Application No. 2-93943.

Although the technique disclosed in Published Unexamined Japanese Patent Application No. 2-56602 has an advantage in a high inference speed, it requires a large memory capacity (e.g., if two 8-bit inputs are required to obtain one 8-bit output, the memory capacity becomes $FF_H \times FF_H = FE01_H$, which is about 64 Kbytes). If such a system is built in a product such as a camera, the camera becomes too large. Therefore, it is difficult to obtain a fuzzy camera.

Although the system disclosed in Published Unexamined Japanese Patent Application No. 2-93943 has a relatively simple arrangement, the position of a if-part membership function is fixed, and this system lacks versatility.

SUMMARY OF THE INVENTION

It is, therefore, an object of the present invention to provide a versatile fuzzy inference apparatus requiring a small memory capacity, and having a simple arrangement and a high fuzzy inference speed.

In order to achieve the above object of the present invention, there is provided a fuzzy inference apparatus comprising:

rule storing means for storing then-part positions respectively corresponding to a plurality of first if-part membership functions and a plurality of second if-part membership functions, the first and second if-part membership functions having shapes of triangles each having a base corresponding to positions of vertices of triangles of two adjacent membership functions, the rule storing means storing the positions of the vertices of the triangles in correspondence with the first and second if-part membership functions;

rule selecting means for sequentially comparing an input value to the first if-part membership functions with positions of a plurality of vertices of the first if-part membership functions stared in the rule storing means, retrieving two adjacent vertex positions between which a position of the input value is located, calculating first and second differences between the retrieved two vertex positions and the input value, sequentially comparing an input value to the second if-part membership functions with positions of a plurality of vertices representing the second if-part membership functions stored in the rule storing means, retrieving two adjacent vertex positions between which a position of the input value is located, and calculating third and fourth differences between the retrieved two vertex positions and the input value;

membership value selecting means for selecting a minimum value of each rule on the basis of magnitudes of the first to fourth differences obtained by the rule selecting means;

membership value storing means for storing the minimum value selected by the membership value selecting means;

then-part selecting means for selecting then-part positions respectively corresponding to the two vertex positions corresponding to the first if-part membership functions stored in the rule storing means and selected by the rule selecting means and the two vertex positions corresponding to the second if-part membership functions stored in the rule storing means and selected by the rule selecting means;

then-part position storing means for storing the then-part positions selected by the then-part selecting means; and center-of-gravity calculating means for calculating a position of a center of gravity on the basis of the minimum values stored in the membership value storing means and the then-part positions stored in the then-part position storing means.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 2A and 2B are views showing if- and then-part membership functions, respectively;

FIG. 3 is a table showing fuzzy matrix rules;

FIGS. 7A, 7B, and 7C are flow charts for explaining the operation of the embodiment shown in FIG. 6;

FIGS. 9, 10, and 11 are tables showing data arrangements for saving the memory capacity;

FIGS. 12A and 12B are flow charts as a modification of the operations in FIGS. 7B and 7C;

FIGS. 13A to 13E are views for explaining a conventional fuzzy inference method;

FIG. 20 is a detailed block diagram showing an arrangement of a center-of-gravity calculation unit;

FIG. 25A is detailed block diagram showing an arrangement of a counter;

FIG. 25B is a table showing a relationship between reset terminal states and outputs in FIG. 25A;

FIG. 26A is a detailed block diagram showing an arrangement of a tristate buffer;

FIG. 26B is a table showing a relationship between E terminal states and outputs in FIG. 26A;

FIG. 27A is a detailed block diagram showing an arrangement of a half adder;

FIG. 27B is a table showing a relationship between inputs and outputs in FIG. 27A;

FIG. 28A is a detailed block diagram showing an arrangement of a full adder;

FIG. 28B is a table showing a relationship between inputs and outputs in FIG. 28A;

FIG. 29 is a detailed block diagram showing an arrangement of a 4-bit full adder;

FIG. 30 is a detailed block diagram showing an arrangement of an arithmetic circuit;

FIG. 31 is a detailed block diagram showing an arrangement of a zero circuit;

FIG. 33 is a detailed block diagram showing an arrangement of a multiplier;

FIG. 34 is a detailed block diagram showing an arrangement of an accumulating adder having a reset function;

FIG. 35 is a detailed block diagram showing an arrangement of a divider; and

DETAILED DESCRIPTION OF THE PREFERRED EMBODIMENTS

Figure 1:
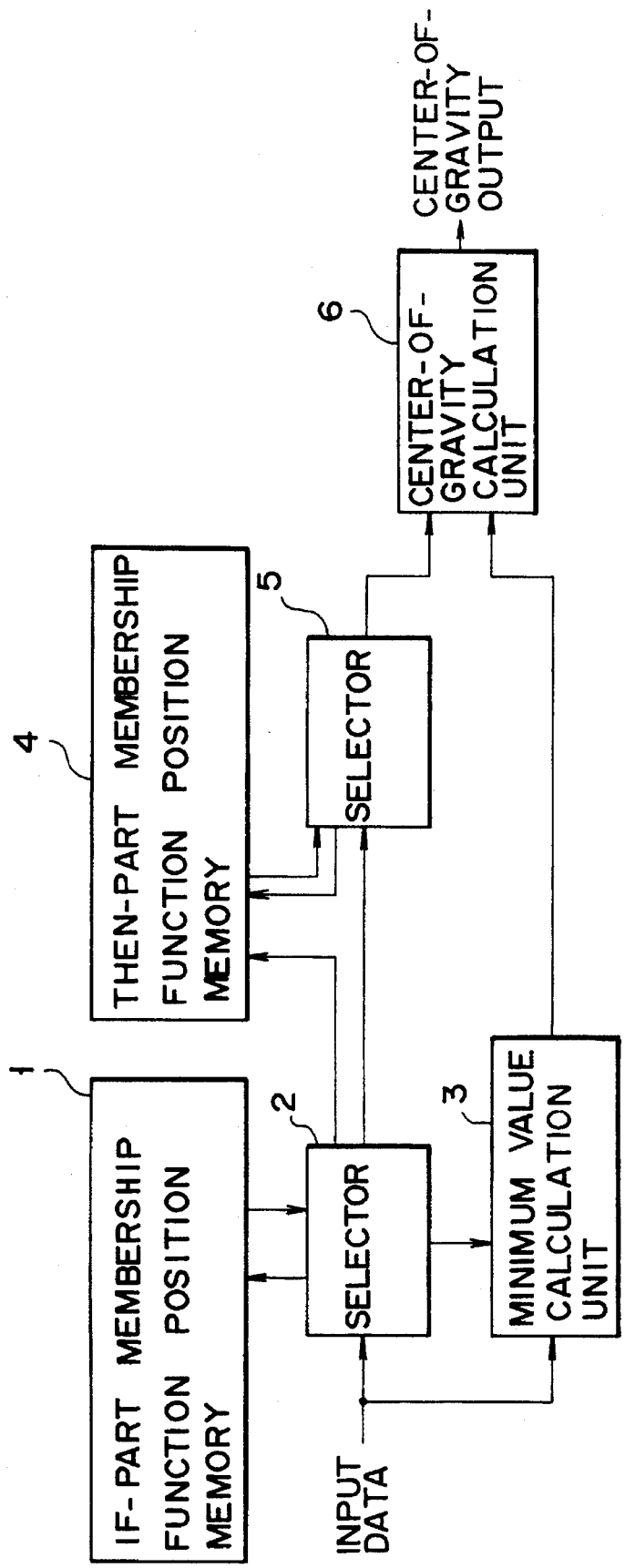
FIG. 1 is a 8 block diagram for explaining the concept of the present invention.

A general description of the present invention will be made with reference to FIG. 1. According to the present invention, each if-part membership function has a triangular shape. The base of each triangle extends to the positions of vertices of triangles of two adjacent if-part membership functions. An if-part membership function position storage unit 1 stores vertex positions of the if-part membership functions. A selector 2 selects each if-part membership function corresponding to input data. A minimum value calculation unit 3 calculates a minimum value of an if-part membership function value by using the selected if-part membership function and the input data. A then-part membership function position storage unit 4 stores position data of then-part membership functions on the basis of addresses of the if-part membership functions. A selector 5 selects position data of the then-part membership function on the basis of the selected if-part membership function. A center-of-gravity calculation unit 6 calculates the center of gravity on the basis of the selected position data and an output from the minimum value calculation unit 3.

Assume that the present invention is applied to a motor control apparatus for a camera disclosed in Japanese Patent Application No. 2-246440 filed by the present applicant. In this patent application, the pulse width of a P.I. (photointerrupter) interlocked with a motor is measured by counting reference clock pulses. A fuzzy inference unit calculates the number of P.I. pulses required for stopping the motor. When the motor is braked at the present moment, in accordance with the previous input data representing the P.I. speed corresponding to the count and with the present input data. The ON, OFF, and braking operations of the motor are switched in accordance with the calculation results.

FIGS. 2A and 2B show membership functions used in the fuzzy inference unit, and FIG. 3 is a matrix table of fuzzy rules.

Referring to FIG. 2A, the count of the P.I. pulse width as an input value is plotted along the abscissa. The previous and present data are input to the fuzzy inference unit. Membership values are plotted along the ordinate. The meanings (labels) of each membership function are defined as follows:

VF: very fast

F: fast

N: normal

S: slow

VS: very slow

The smaller the count becomes, the higher the motor speed becomes. FIG. 2A is formed on the basis of this fact.

In this embodiment, since the count values of the P.I. pulse widths are employed as the previous and present input values, the membership function in FIG. 2A can be commonly used.

FIG. 2B is a then-part membership function. In this case, since only position data (abscissa) is an important factor, the respective labels employ triangles having zero bases. In some cases, the heights of the membership functions may be determined in accordance with degrees of importance. However, all heights are 1 in this embodiment. The number of pulses required to stop the motor is plotted along the abscissa. The meanings of the labels are defined as follows:

N: a very small number of pulses required to stop the motor

S: a small number of pulses required to stop the motor

M: a medium number of pulses required to stop the motor

B: a large number of pulses required to stop the motor

VB: a very large number of pulses required to stop the motor

The matrix table in FIG. 3 has a total of nine rules. The meanings of the rules will be described below. For example, a portion suffixed with (a) indicates that if a previous input to an if-part membership function is N and a present input is F, a then-part membership function represents B. In other words, this rule indicates that if "the previous input represents a normal speed (N) and the present input represents a fast speed (F), a large number of pulses (B) are required to stop the motor".

Similar interpretations apply to other rules. No rule is set in a blank column because this possibility is impossible in practice. For example, if a previous input is S, a present input cannot be VF.

As is apparent from the table, when the previous input is VF, a corresponding then-part membership function is available under the condition that the present input is VF or F. In this case, the corresponding then-part membership function represents VB or B.

When the previous input is F, a corresponding then-part membership function is available under the condition that the present label is VF, F or N. In this case, the corresponding then-part membership function represents VB, B or M.

If the previous input is N, a corresponding then-part membership function is available under the condition that the present level is F or N. In this case, the corresponding then-part membership function represents B or M.

If the previous input is S, a corresponding then-part membership function is available only under the condition that the present label is S. In this case, the corresponding then-part membership function represents S.

If the previous input is VS, a corresponding then-part membership function is available only under the condition that the present label is VS. In this case, the then-part membership function represents N.

It is apparent from the above description that the present label corresponds to the same label as that of the previous input or to an adjacent label. In the membership function set as described in FIG. 2A, it is apparent that a maximum of two labels of a membership function are associated with a given input.

For example, of the labels F and N each marked with an asterisk *, assume input values (P.I count values) of the previous and present inputs fall within the range of 70 to 90. It is apparent that only four rules to be described later are necessary. That is, if a previous input is defined as xi and a present input is defined as yi, only the following four rules are required.

xi=F and yi=F xi=F and yi=N xi=N and yi=F xi=N and yi=N

Other rules do not influence gravity calculations because either the previous or present membership function value becomes zero.

Figure 4:
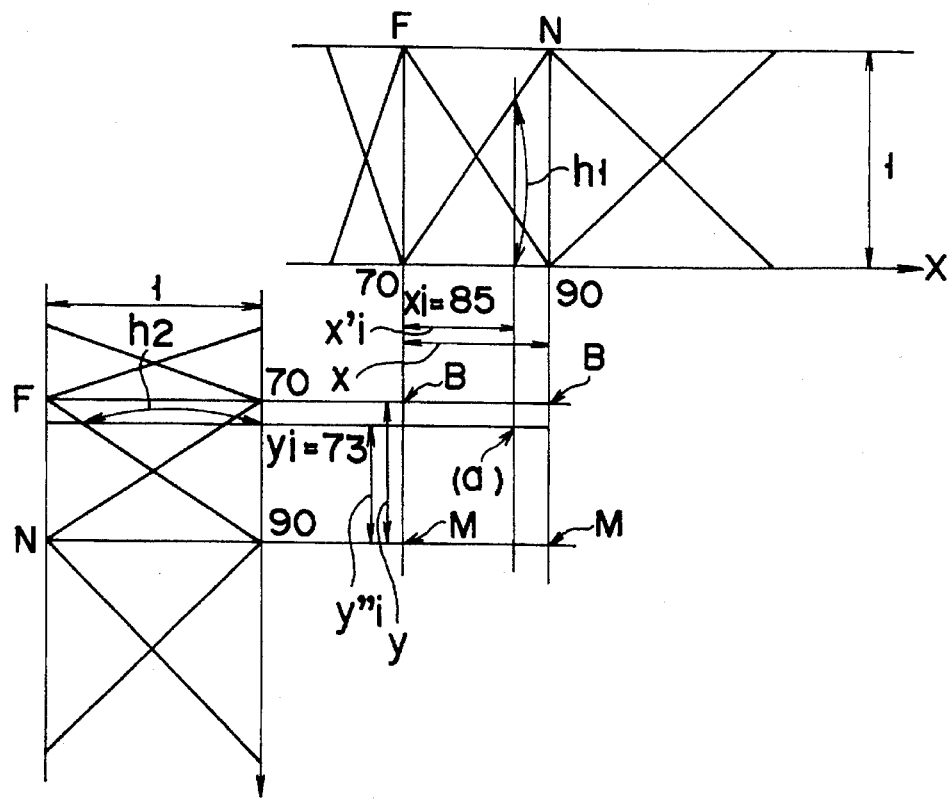
FIG. 4 is a view obtained by expressing part of the matrix table of FIG. 3 by membership functions.

The matrix table in FIG. 3 is represented by membership functions, as shown in FIG. 4. Previous input data are plotted along the x-axis, and present input data are plotted along the y-axis.

As shown in FIG. 4, assume that the previous and present inputs, i.e., xi=85 and yi=73, are received by the fuzzy inference unit.

This will be represented by a conventional inference method, as shown in FIG. 13A to 13E, because an MIN-MAX-center-of-gravity calculation operations of the inputs xi and yi must be performed in units of rules. Since this method is a well-known inference method, a detailed description thereof will be omitted.

Referring back to FIG. 4, an intersection B (corresponding to the label B in FIG. 3) obtained by extending the height of a vertex (goodness of fit: 1) of a membership function for xi=F and yi=F represents position data of a then-part membership function of the label B.

Similarly, an intersection M (corresponding to the label M in FIG. 3) obtained by extending the height of a vertex (goodness of fit: 1) of a membership function for xi=F and yi=N represents position data of a then-part membership function of the label M.

Similarly, an intersection B (corresponding to the label B in FIG. 3) obtained by extending the height of a vertex (goodness of fit: 1) of a membership function for xi=N and yi=F represents position data of a then-part membership function of the label B.

Finally, an intersection M (corresponding to the label M in FIG. 3) obtained by extending the height of a vertex (goodness of fit: 1) of a membership function for xi=N and yi=N represents position data of a then-part membership function of the label M.

When inputs associated with the labels F and N are received and the goodness of fit of the inputs xi and yi ($70 \leq xi \leq 90$ and $70 \leq yi \leq 90$) is one or less, the inputs take any positions within a rectangle defined by the intersections B, M, M, and B.

The height of an if-part membership function is normally "1", but this value is arbitrarily determined. Although the value is not limited to a specific value, the heights of all the if-part membership functions must be the same.

As is apparent from the above description, according to the present invention, it is found that if a given membership function has a triangle whose base extends up to vertices of the adjacent membership functions in 2-input fuzzy inference, the number of necessary inference rules is four (i.e., four rules within a square, which belong to the asterisk * in the matrix table of FIG. 3). If common membership functions are used for the previous and present inputs, the lengths of the four rules in the x direction are equal to those in the y direction. Therefore, the positions of the membership functions can be arbitrarily selected.

In this embodiment, the height of membership functions can be substituted with x-axis position data for the following reason. Referring to FIG. 4, 1: h1=X: xi', and 1: h2=Y: yi". If X=Y then h1: h2=xi': yi". A minimum value calculation between the membership value (height) h1 of the previous input and the membership value (height) h2 of the present input can be converted into a minimum value calculation between the positions xi' and yi" along the x-axis.

In the case of FIG. 4, the height of the membership functions having the label N of the previous and present inputs can be set to be 20=90 (N value)−70 (F position) because common membership functions are used for the previous and present inputs and condition N−F=20 is established in both the x- and y-axes. Therefore, the height h1 for the input xi=85 can be set to be 15 (=85−70).

In this case, since the heights of the membership functions are always 20 in both the x and y directions, weighting functions of the rules are not changed. In this case, each of the heights of the membership functions is 20. However, if the x-axis length is equal to the y-axis length, i.e., if a square is established, the height value need not be 20.

Figure 5:
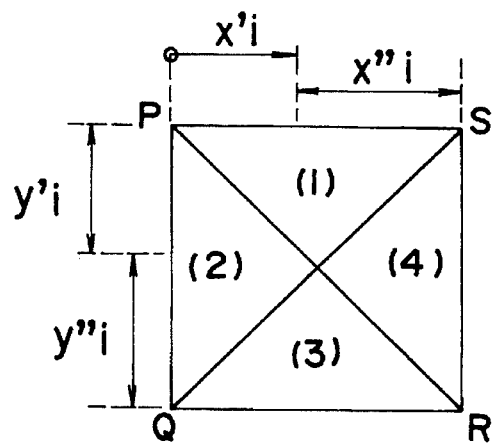
FIG. 5 is a view for determining a minimum value.

FIG. 5 corresponds to the square of FIG. 4. The intersections B, M, M, and B in FIG. 4 are substituted with points P, Q, R, and S, respectively. The points P, Q, R, and S represent position data of the then-part membership functions and have a height of 1.

Referring to FIG. 5, xi' is a value of 15 obtained by subtracting a position (70 in FIG. 4) of a previous if-part (if-part 1) membership function associated with the then-part position P from an input xi=85. Similarly, yi' is a value of 3 obtained by subtracting a position 70 of a present if-part (if-part 2) membership function from the input yi. In addition, xi" is a value of 5 obtained by subtracting a value of 85 up to the input xi from a position 90 of the previous if-part (if-part 1) membership function associated with the then-part position S, and yi" is a value of 17 obtained by subtracting an input yi=73 from a position 90 of the present if-part (if-part 2) membership function associated with the then-part position Q.

The label F of the if-part 1 corresponds to the label F of the if-part 2 at the then-part position P, as can be derived from FIG. 3. At this time, as previously described, the height of the label F of the if-part 1 can be converted into $xi''$, and the height of the label F of the if-part 2 can be converted into $yi''$. This is true for the remaining positions Q, R, and S.

The membership values derived from the inputs xi and yi of the if-part membership functions can be expressed by $xi''$ associated with the label F of the if-part 1 and $yi''$ associated with the label F of the if-part 2. Similarly, Q, R, and S can be similarly expressed by pairs of $xi''$ and $y'$, $xi'0$ and $yi'$, and $xi'$ and $yi''$, respectively.

The above operations can be summarized in Table 1 below.

TABLE 1

| Position of Then-Part Membership Function | Membership Value of If-Part 1 | Membership Value of If-Part 2 |
|---|---|---|
| P | $xi''$ | $yi''$ |
| Q | $xi''$ | $yi'$ |
| R | $xi'$ | $yi'$ |
| S | $xi'$ | $yi''$ |

If-part membership values for the positions P, Q, R, and S of a then-part membership function are determined by the values $xi'$, $xi''$, $yi'$, and $yi''$.

A minimum value of the membership values derived from the two if-part membership functions of each rule for the inputs xi and yi can be selected from and determined by the values $xi'$, $xi''$, $yi'$, and $yi''$.

A method of obtaining this minimum value will be described below.

In Table 1, the position P has either $xi''$ or $yi''$ as a minimum value, the position Q has either $xi''$ or $yi'$ as a minimum value, the position R has either $xi'$ or $yi'$ as a minimum value, and the position S has either $xi'$ or $yi''$ as a minimum value. In the square shown in FIG. 5, a diagonal line PR is a line segment satisfying condition $xi'=yi'$, and a diagonal line QS is a line segment satisfying condition $xi''=yi''$. If inputs xi and yi fall within a range (1) in FIG. 5, conditions $xi'>yi'$ and $xi''>yi'$ are simultaneously satisfied. If the inputs xi and yi fall within a range (2), $xi'<yi'$ and $xi''>yi'$ are simultaneously satisfied. When the inputs xi and yi fall within a range (3), $xi'<yi'$ and $xi''<yi'$ are simultaneously satisfied. When the inputs xi and yi fall within a range (4), $xi'>yi'$ and $xi''<yi'$ are simultaneously satisfied.

The minimum value, i.e., the height of each then-part membership function can be obtained by determining one of the ranges (1) to (4) to which the values $xi'$ and $yi'$ belong. The obtained minimum values in the respective ranges are summarized in Table 2 below.

TABLE 2

| | | Position of Then-Part Membership Function | | | |
|---|---|---|---|---|---|
| Range | | P | Q | R | S |
| $xi' > yi'$ $xi'' > yi'$ | (1) | $xi''$ | $yi'$ | $yi'$ | $xi'$ |
| $xi' < yi'$ $xi'' > yi'$ | (2) | $yi''$ | | | $xi''$ |
| $xi' < yi'$ $xi'' < yi'$ | (3) | | $xi''$ | | $yi''$ |
| $xi' > yi'$ $xi'' < yi'$ | (4) | $xi''$ | | $yi'$ | |

If the values $xi'$ and $yi'$ fall within the range (1), a center of gravity G is obtained by the following equation.

$$G = \frac{P \cdot xi'' + Q \cdot yi' + R \cdot yi' + S \cdot xi'}{xi'' + yi' + yi' + xi'}$$

The center of gravity can be similarly obtained when the values $xi'$ and $yi'$ fall within each of the ranges (2), (3), and (4).

Figure 6:
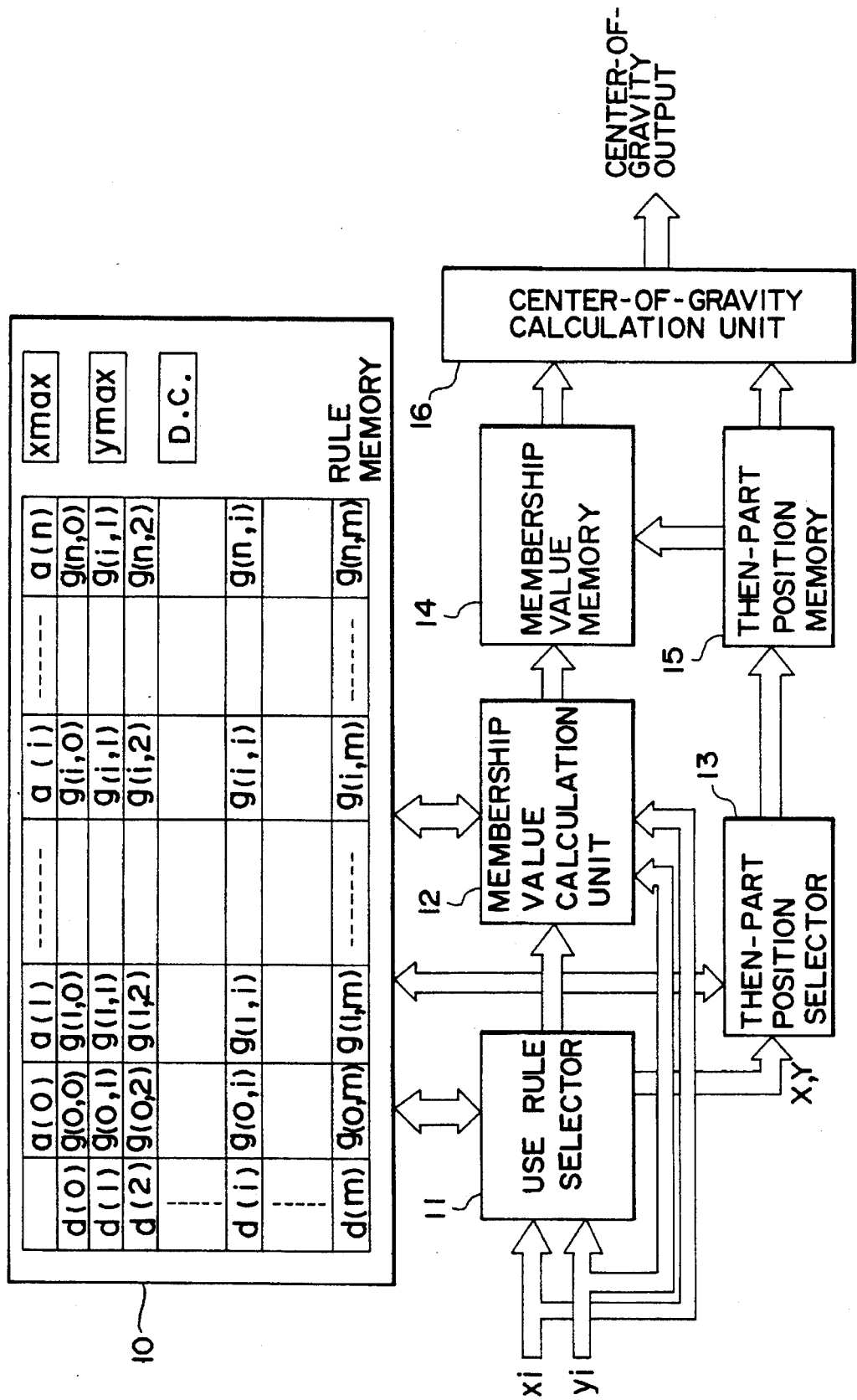
FIG. 6 is a block diagram for realizing the present invention according to an embodiment.

FIG. 6 is a detailed block diagram for realizing the above inference method. This block diagram can be realized by a digital logic circuit or software using a microcomputer.

Referring to FIG. 6, a rule memory 10 stores the positions of if- and then-part membership functions. A symbol such as g(i,i) used in the rule memory 10 represents a memory address position. Data stored at the address position, e.g., g(i,i) is represented by (g(i,i)). Data stored at other addresses can be similarly expressed.

Reference symbols a(0) to a(n) denote memory areas for storing the positions of the membership functions of the if-part 1, and the memory areas a(0) to a(n) represent x-axis positions of the membership functions in FIG. 4.

Reference symbols d(0) to d(m) denote memory areas for storing the positions of the membership functions of the if-part 2, and the memory areas d(0) to d (m) represent y-axis positions of the membership functions.

Reference symbol $x_{max}$ denotes a memory area representing the number of membership functions defined in the x-axis; and $Y_{max}$, a memory area representing the number of membership functions defined in the y-axis. If values n and m are fixed, the memory areas $x_{max}$ and ymax can be omitted. Memory areas g(0,0) to g(n,m) represent the positions of the then-part membership functions.

For the sake of descriptive convenience, the rule memory 10 in FIG. 6 has the same arrangement as the fuzzy matrix table in FIG. 3, but the arrangement of the rule memory 10 need not be limited to this. A memory area D.C. stores a value substituted in the memory area (i,j) corresponding to the blank portion (a portion having no rule) in FIG. 3. The memory area D.C. is arranged because the range of the then-part membership functions cannot be limited. For example, when the range of the then-part membership functions ranges from 2 to 34, as shown in FIG. 2B, values smaller than 2 and larger than 34 are stored in the memory area D.C., and the same values are stored in the memory area g(i,j) corresponding to the blank portions having no rules. If data falling outside the range of then-part membership functions is always present, it is used as data stored in the memory area D.C. In this case, the memory area D.C. can be omitted.

Figure 7B:
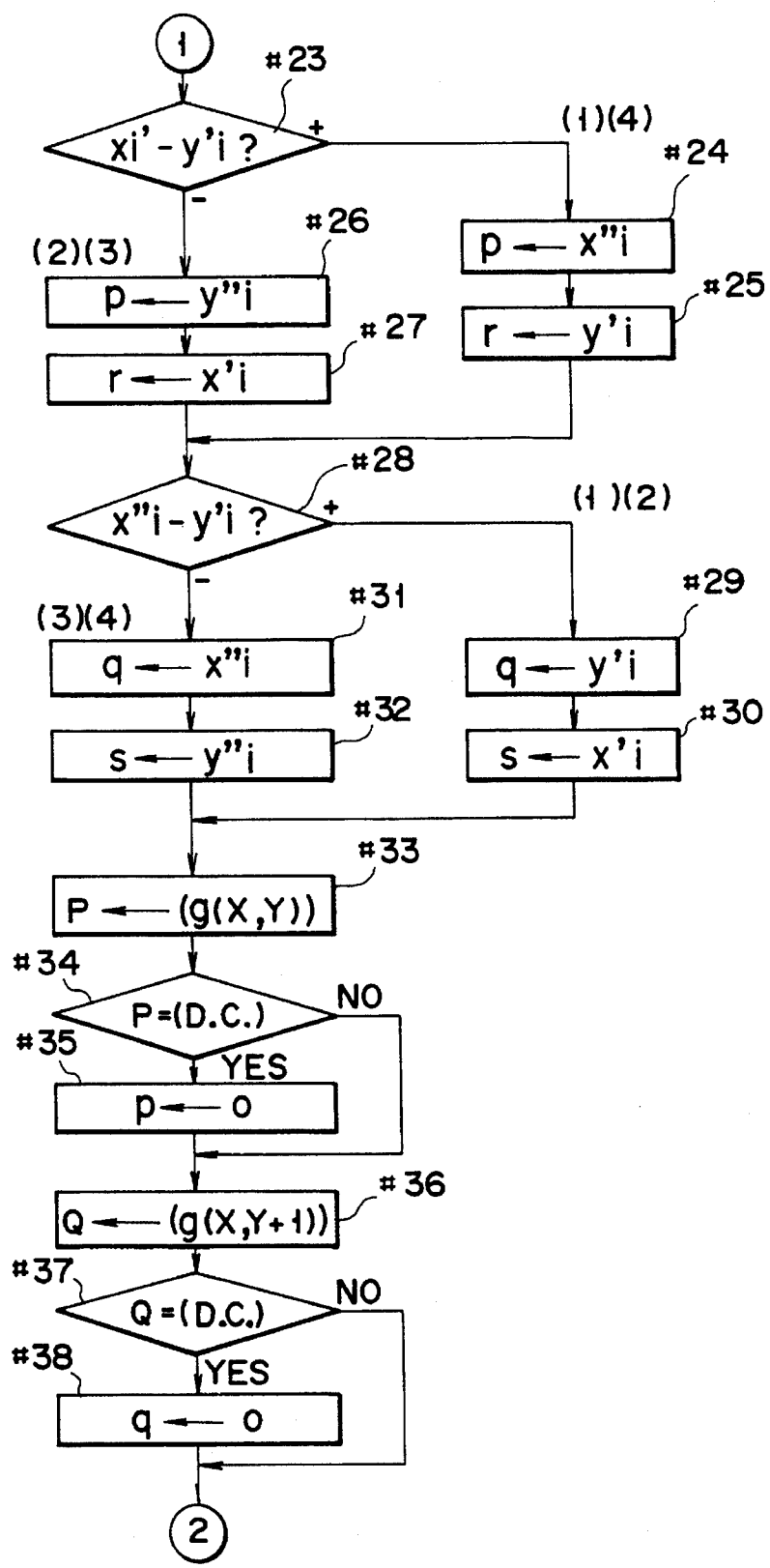

An operation of the block diagram in FIG. 6 will be described with reference to FIGS. 7A, 7B, and 7C.

Operations in steps #1 to #22 as the operation of a use rule selector 11 will be described. In step #1, 0 is set in i to update (a(i)) to (a(0)). In step #2, (a(0)) is subtracted from an input xi. If the difference is positive, it is checked in step #3 whether $i=(x_{max})$ so as to determine whether the number of membership functions reaches a defined number of membership functions. If NO in step #3, 1 is added to i (step #4), and the flow returns to step #2 to repeat the above operation. However, if YES in step #3, (a(i)) is substituted into xi (step #5). If the difference xi−(a(i)) becomes negative, an operation in step #6 is executed to determine whether condition i=0 is satisfied. If i≠0, then a difference i−1 obtained by subtracting 1 from i is substituted in i (step #8). The resultant value i is set to be X (step #9). If i=0 in step #6, (a(0)) is substituted into xi (step #7). In step #10, (a(i)) is subtracted from xi to obtain a value $xi'$, and xi is subtracted from (a(i+1)) to obtain a value $xi''$ (step #11).

The same operations as described above are performed in the Y direction to obtain values Y, $yi'$, and $yi''$ (steps #12 to #22).

In other words, in the above steps, the data (a(i)) is compared with the input xi from i=0 to determine a specific x-axis position of the membership function of the input xi. A memory address at which the position of a membership function preceding the input xi is stored as X. When the input xi is smaller than the position of the first membership function, the input xi is changed as xi←(a(0)), and a gravity calculation unit 16 is set to be commonly used. In this case, an operation x←0 is performed.

If the input xi is larger than a membership function having the largest position value, the following operations are performed: xi←(a(i)) for i=($x_{max}$) and then X←($x_{max}$).

The values xi' and xi" are calculated as described above, and then the same operations as described above are performed in the y-axis, thereby obtaining values Y, yi', and y". In the use rule selector 11, addresses X and Y of a memory area g(X,Y) representing a then-part position A in FIG. 5 and the values xi', xi", yi', and yi" are obtained from the inputs xi and yi with reference to the rule memory 10.

A membership value calculation unit 12 determines one of the ranges (1), (2), (3), and (4) to which the values belong with reference to Table 2 and selects a minimum value. The steps associated with this selection are steps #23 to #32.

Registers for storing variables p to s correspond to positions P to S of the then-part membership functions.

In step #23, yi' is subtracted from xi', and if the difference is positive, the values are determined to belong to the ranges (1) and (4). In this case, xi" is stored in p, and yi' is stored into r (steps #24 and #25). In step #23, if the difference is negative, the values fall within the ranges (2) and (3). In this case, yi" is stored in p and xi' is stored in r (steps #26 and #27). The value yi' is subtracted from the value xi" (step #28). If the difference is positive, the values fall within the ranges (1) and (2). In this case, yi' is stored in q, and xi' is stored in s (steps #29 and #30). However, if the difference is negative, the values fall within the ranges (3) and (4). In this case, xi" is stored in q and yi" is stored in s (steps #31 and #32). By these operations, the minimum values for the four rules are stored in the registers p, q, r, and s. In step #33, the content of the address g(X,Y) of the then-part membership function values corresponding to the values X and Y is stored in the register P in a then-part position memory 15. It is then determined in step #34 whether the register P=D.C. is established. If YES in step #34, 0 is stored in the register p (step #35). However, if NO in step #34, an operation in step #36 is executed to store the content of the address g(X,Y+1) in the register Q. It is determined in step #37 whether Q is equal to D.C. If YES in step #37, 0 is stored in the register q in step #38. The same operations as described above are performed for addresses g(X+1,Y) and g(X+1,Y+1). Finally, the value of the center of gravity is obtained on the basis of the calculated data (step #45).

In other words, the square ranges (1) and (4) or (2) and (3) in FIG. 5 are determined in accordance with the sign of the difference (xi'−yi'), and the minimum values to be stored in the registers p and E are determined. Similarly, the minimum values stored in the registers q and s are determined in accordance with the sign of the difference (xi"−yi'). The values of the registers p to s are transferred and stored in a membership value memory 14.

A then-part position selector 13 selects values corresponding to the then-part positions P to S in accordance with the values X and Y determined by the use rule selector 11 by reading the contents at the addresses g(X,Y) to g(X+1,Y+1). The selected values are stored in the variables P to S of the then-part position memory 15. At the same time, when the data stored at the memory address D.C. coincides with the substitution values of the registers P to S in the then-part position memory 15, the values of the variables p to s corresponding to the variables P to S are set to be zero in order to eliminate influences of the memory area having no rule.

Finally, the center-of-gravity calculation unit 16 performs the following operations to obtain the center of gravity by using the above variables:

$$G \leftarrow \frac{P \cdot p + Q \cdot q + R \cdot r + S \cdot s}{p + q + r + s}$$

The processing has been described with reference to the flow charts. However, this processing can be realized by using a digital circuit. In this case, if two 8-bit inputs and seven if-part 1 and 2 membership functions are used, memory areas become a(0) to a(6), d(0) to d(6), and g(0,0) to g(6,6). In this case, a required memory capacity is a 63-byte memory capacity, which can be realized by a one-chip microcomputer.

When the memory in the matrix unit is constituted by a RAM, it can be used as a versatile fuzzy inference system by updating the RAM contents.

As is apparent from the above flow charts, only a minimum number of rules are used, and the calculation time can be largely shortened. In addition, even if the if-part membership functions comprise an if-part 1 and an if-part 2 which is different from the if-part 1 (i.e., a rectangle in FIG. 5), a fuzzy inference system can be easily realized by employing the present invention. That is, the values yi' and yi" can be increased or decreased as follows:

$$yi' \leftarrow yi' \times \frac{xi' + xi''}{yi' + yi''}$$

$$yi'' \leftarrow yi'' \times \frac{xi' + xi''}{yi' + yi''}$$

Figure 8:
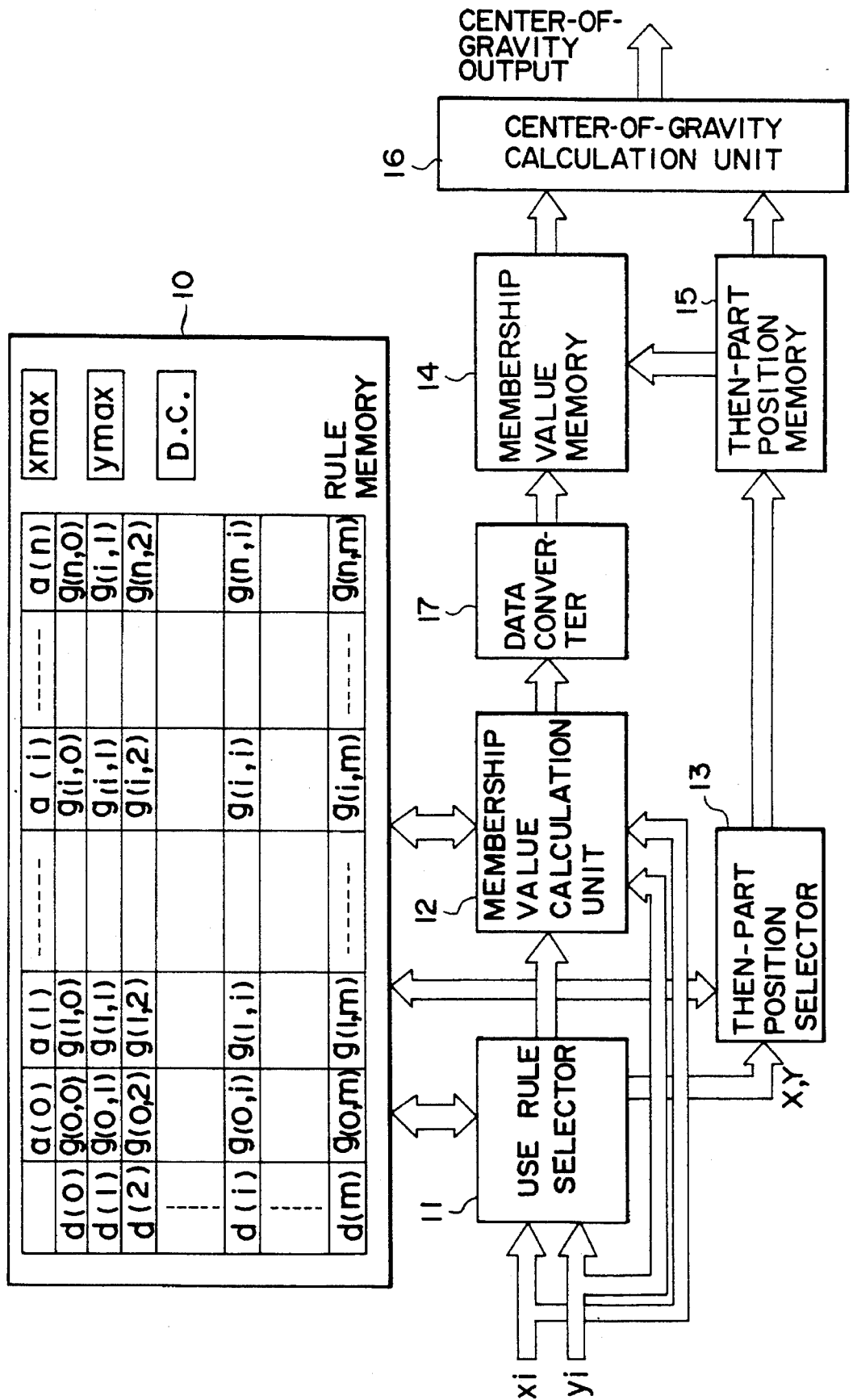
FIG. 8 is a block diagram showing another embodiment of the present invention.

FIG. 8 is a block diagram for increasing or decreasing the values yi' and yi". This increase or decrease is performed by a data converter 17. The increase or decrease can be performed by a mathematical expression other than the one described above. Alternatively, instead of an increase or decrease of the values y, only the values x or both the values x and y may be increased or decreased.

In the center-of-gravity calculation, the MAX calculation of the then-part membership functions is not performed. However, the MAX calculation may be performed by the following method. For example, in the case of FIG. 4, since then-part membership functions corresponding to P, Q, R, and S are B, M, M, and B, the same membership functions are available. Under this condition, the MAX calculation is performed using only a membership function having a large membership value.

Figure 12B:
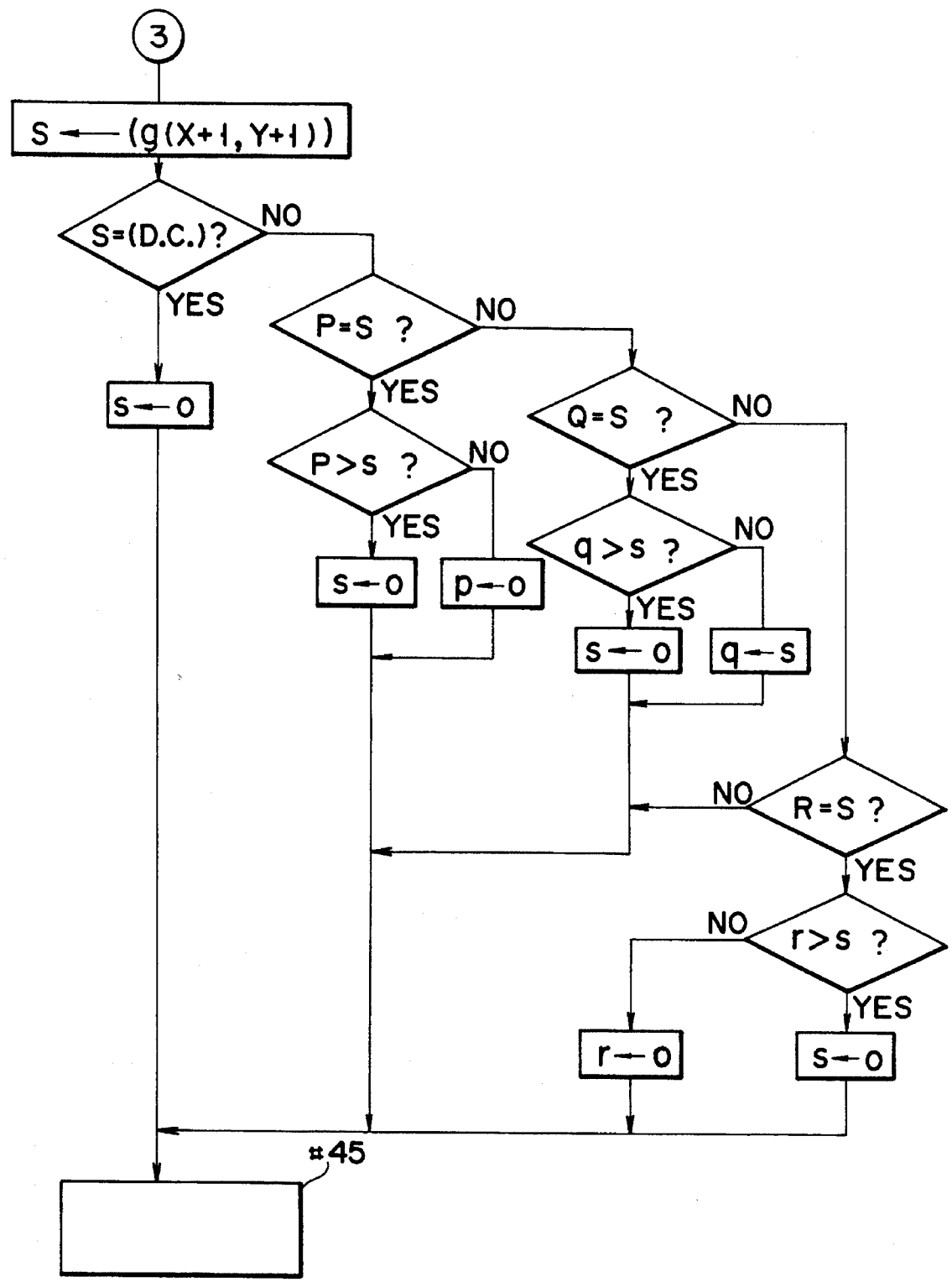

A larger one of the values p and s or a larger one of the values q and r is employed. In order to perform a MAX calculation, the operations in steps #36 to #44 in FIGS. 7B and 7C are changed, as shown in FIGS. 12A and 12B.

More specifically, the values P, Q, R, and S are checked to determine whether the values are equal to each other. If this condition is established, the variables p to s corresponding to the equal P to S are compared, and a smaller one of the variables is set to be zero. For example, if the then-part membership functions corresponding to P, Q, R, and S are B, M, M, and B, respectively, conditions P=S and Q=R are established. In accordance with the flow chart, the variables p and s and the variables q and r are compared, and the smaller variables are set to be zero. As described above, the MAX calculation can be easily performed.

A method of further reducing the memory capacity of the rule memory 10 will be described below.

In the camera motor control rules, when the previous and present P.I. speeds are used as the if-part 1 and the if-part 2, respectively, the difference between the inputs xi and yi is not so large. In this case, rules are set so that the then-part membership functions are present at diagonal portions, as shown in FIG. 3.

When the rules are determined as described above, a large number of blank portions (portions having no rule) are formed, and the memory is wasted, resulting in inconvenience.

The rules in FIG. 3 are written in a memory required for the matrix unit in the rule memory 10 (FIG. 6), as shown in FIG. 9.

Y-X values are plotted along the ordinate after the memory addresses X and Y of the P position (FIG. 5) corresponding to the inputs xi and yi (FIG. 9) are determined, as shown in FIG. 10. In this state, since the memory addresses are not arranged in order, e(i) and j(m,n) are assumed to obtain a memory arrangement shown in FIG. 11. In order to cause the arrangement of FIG. 10 to correspond to that of FIG. 11, i=Y−X+1 (i is the ith address of e(i)) and g(X,Y)=j(X,i)=J(X,Y−X+1).

Even if the memory map shown in FIG. 11 is used, the address for g(X,Y) can be obtained as J(X,Y−X+1) by the then-part position memory 15. In this case, a memory capacity is ⅗ as compared with that in FIG. 9.

Figure 14:
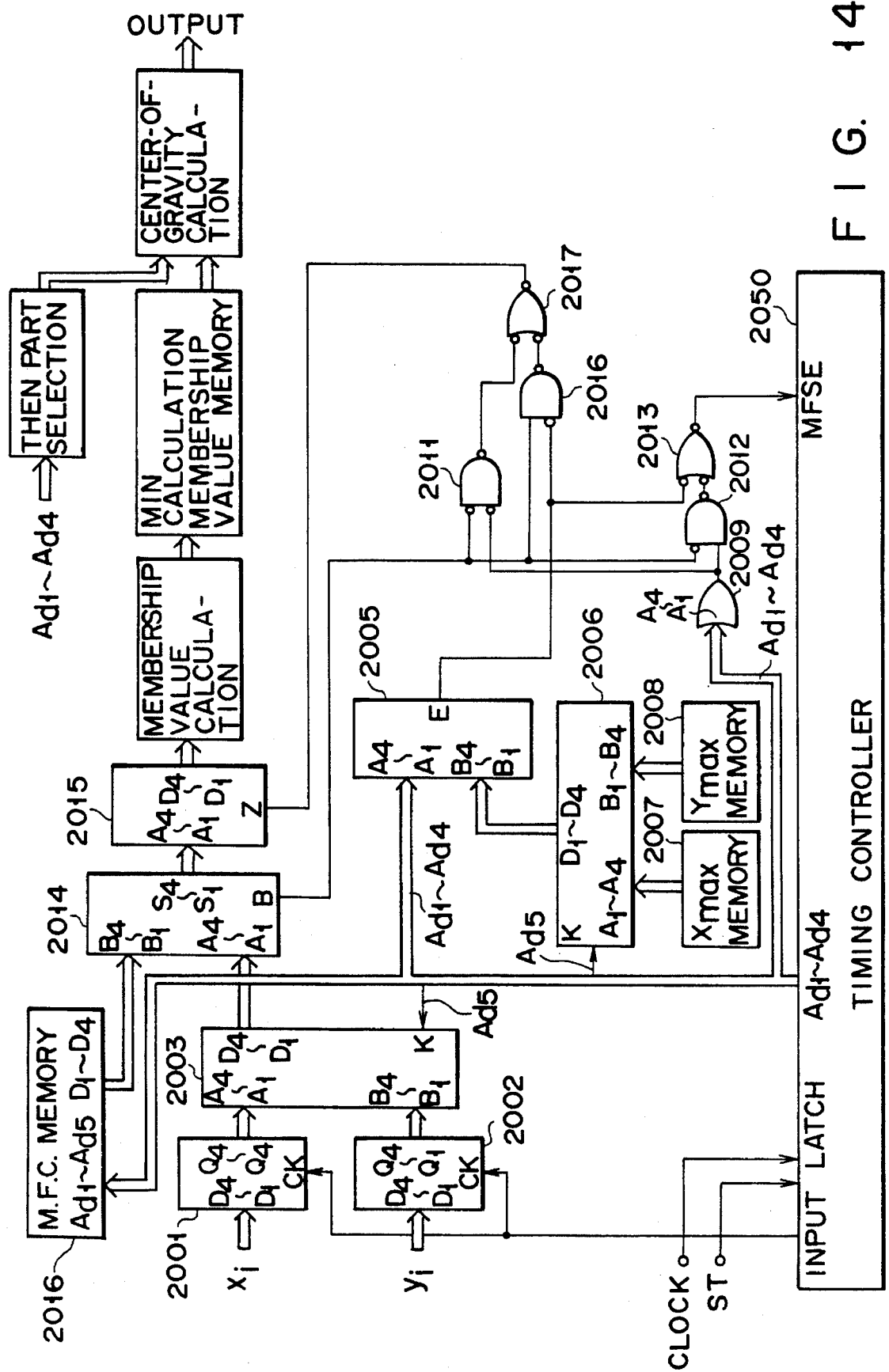
FIG. 14 is a detailed block diagram of FIG. 8.

FIG. 14 is a detailed block diagram of FIG. 8. In this case, a 2-input (xi and yi) arrangement is exemplified. A detailed arrangement of FIG. 8 can be obtained even if the number of inputs is three or more.

For the sake of descriptive convenience, each of an input and a membership value is exemplified as 4-bit data. However, this value can be 8-bit data.

When a reference clock is supplied to a clock terminal and a signal ST goes "L", an inference operation is started.

External storage contents must be set in an M.F.C. memory 2016 (corresponding to the rule memory 10 in FIG. 8) for storing rules and membership functions. This setup operation is not directly associated with the principal object of the present invention, and its setup method will be omitted.

The RAM content setup can be designed in accordance with known techniques and has been described in U.S. Ser. No. 536,444 (filing date: Jun. 12, 1990) filed by the present applicant. In addition, for the sake of descriptive simplicity, when an address is input to a memory, a storage content at the designated address is automatically output.

Figures 15A, 15B, 15C, 15D, 15E, 15F, 15G, 15H, 15I, 15J, 15K, 15L, 15M, 15N:
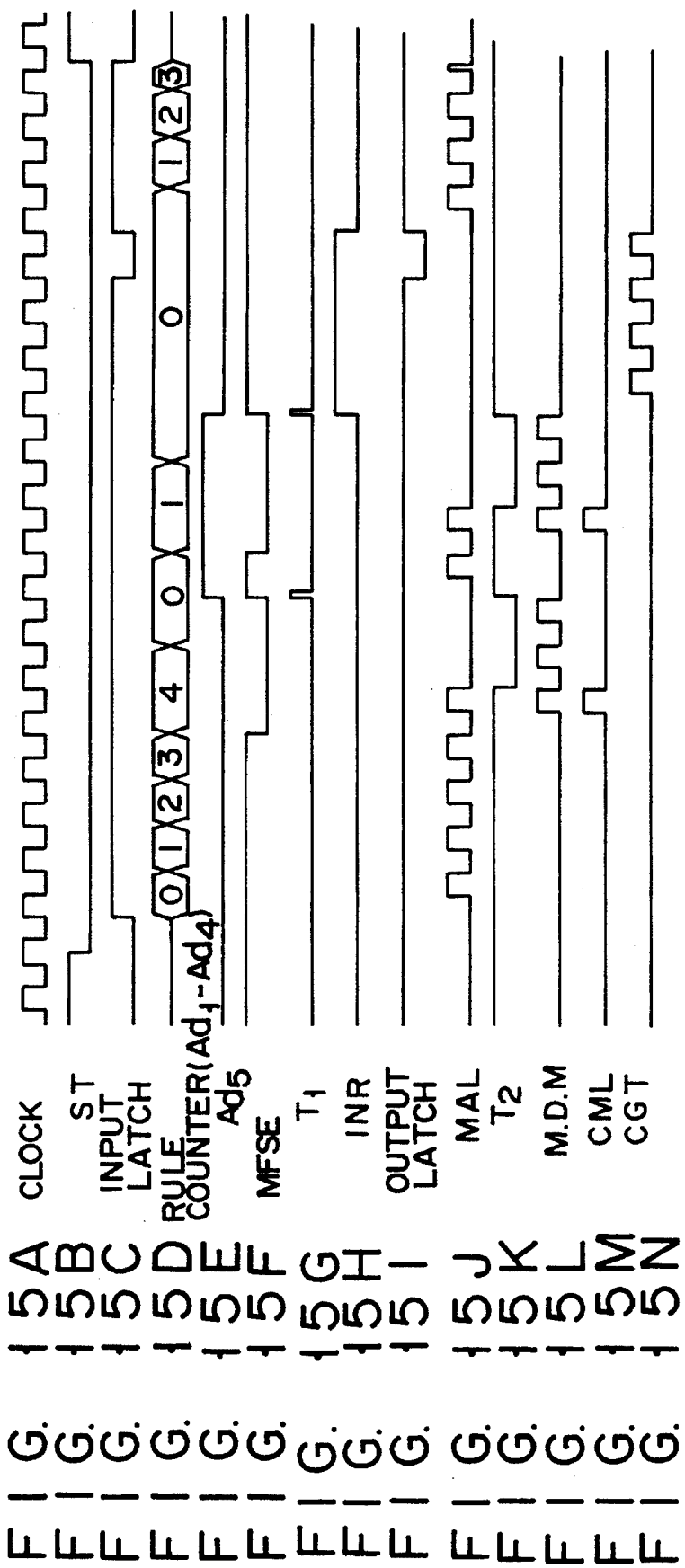
FIGS. 15A to 15N are timing charts showing an operation of FIG. 14.
Figure 16:
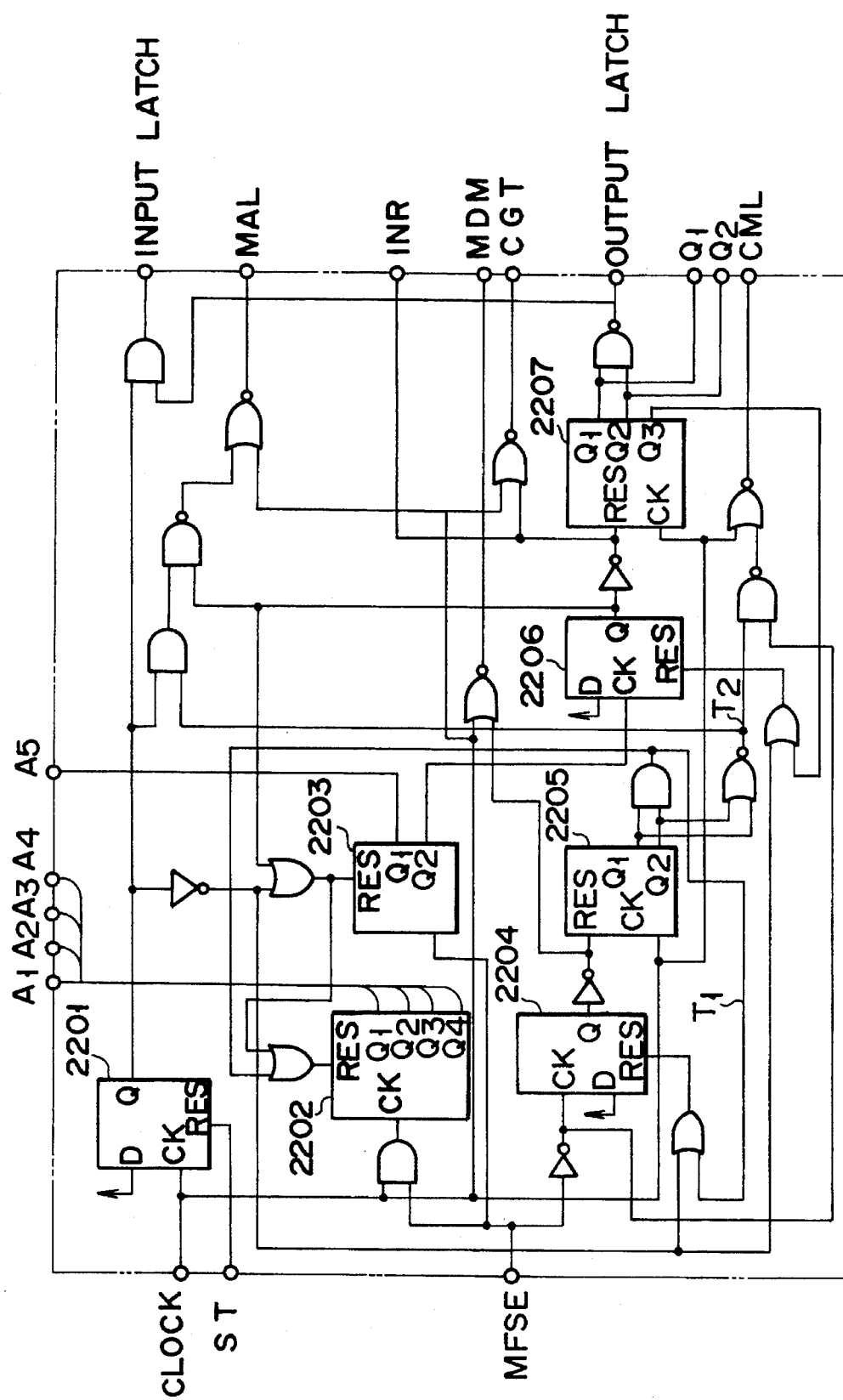
FIG. 16 is a detailed block diagram showing an arrangement of a timing controller.

Timing charts in FIGS. 15A to 15N and a timing controller 2050 in FIG. 16 will be described with reference to FIG. 14.

When the signal ST goes "L", an inference calculation is started. At the leading edge of the first clock in the "L" state of the signal ST, a latch signal rises by a DF/F (D flip-flop) 2201. An input latch outputs an input latch signal in synchronism with a latch signal at the end of inference.

The DF/F 2201 is an asynchronous D flip-flop which outputs a D input in synchronism with a leading edge of a clock CK.

Address bits $A_{d1}$ to $A_{d5}$ in FIG. 14 are used to address the M.F.C. memory 2016 to select an if-part membership function. The address bits $A_{d1}$ to $A_{d4}$ designate a membership function address of each input, and the address bit $A_{d5}$ is used to select the type of input (xi or yi in the previous description). If the number of inputs is three or more, an upper bit of a counter 2203 which outputs the address bit $A_{d5}$ may be used.

A counter 2202 for outputting the address bits $A_{d1}$ to $A_{d4}$ starts counting of the first inputs (xi) from the leading edge of the input latch signal and stops counting the first inputs when a signal MFSE (to be described later) is set at "L" level. When the next input (yi) address bit $A_{d5}$ is updated, counting continues until the signal MFSE of level "L" is output.

The end of selection of membership functions for all inputs (xi and yi in this case) is determined by the number of different types of membership functions counted by a count value of the $A_{d5}$ counter 2203 for counting the number of signals MFSE. In this case, since the number of types of inputs is two, when the count value reaches 2, a DF/F 2206 is reset to set the center-of-gravity calculation cycle. When the number of inputs is increased, a desired combination of outputs from the counter 2203 is selected to set the DF/F 2206.

A center-of-gravity calculation timing signal is generated by a counter 2207. The counter 2207 outputs memory selection addresses Q1 and Q2. If the number of inputs is larger than 2, upper bits of the addresses Q1 and Q2 can be used to cope with an increase in the number of inputs.

A membership function selector (corresponding to the use rule selector 11 in FIG. 8) will be described with reference to FIG. 14.

Inputs xi and yi are simultaneously latched by latches 2001 and 2002 and are kept latched until the end of one inference calculation cycle. A membership function is selected for every input. A selector 2003 selects the input xi. When selection of a membership for the input xi is completed, the mode is switched to select a membership function for the input yi. That is, the same operation as described above is repeated. If the number of inputs is three or more, the number of selectors is increased, and an upper bit of the counter 2203 in the timing controller is used, thereby switching the inputs.

Membership function data (position data of the vertices of a triangle in this case) for each input are stored in the M.F.C. memory 2016. An address bit $A_{d5}$ corresponds to each input, and address bits $A_{d4}$ to $A_{d1}$ correspond to membership functions of the input. If the number of inputs is three or more, the upper bit of the counter 2203 is used to cope with the increase in the number of inputs.

Selection of if-part membership functions is performed such that position data of the vertices of a triangle stored in the M.F.C. memory 2016 are sequentially subtracted from the normally latched input value, and that it is checked whether the difference becomes negative.

A subtracter 2014 is a circuit for outputting the absolute value of the difference. If the difference is negative, an output B is set at "L" level, and its details are shown in FIG. 30. If the difference becomes negative when the address bits $A_{d1}$ to $A_{d4}$ are set to be "0"s, the address is selected up to address 1 for the operational convenience, thereby completing selection of membership functions. When the address is set to be "0", even if the output B of the subtracter is set at "L" level by an output from a 0 determination circuit 2009 (when the address bits $A_{d1}$ to $A_{d4}$ are ORed, and an OR output is set at "L" level, the address is determined to be "0"), the signal MFSE signal is kept at "H" level by a gate 2012. The signal MFSE signal goes "L" at the time of the next address 1, thereby completing selection. When the difference becomes negative at the address 0, the difference at the address 0 is nullified by a zero circuit 2015 (FIG. 31).

When a membership function is selected at the most significant position and the output B of the subtracter 2014 is not set at "L" level, the difference is nullified to zero by the zero circuit 2015 on the basis of signals from gates 2016 and 2017.

The address of the last membership function for each input is determined by a comparator 2005 (FIG. 24A) in accordance with a value selected from memories 2007 and 2008 by the output $A_{d5}$ of the counter 2203. When the number of inputs is three or more, the number of memories is increased and the number of selectors is increased to easily cope with the increase in the number of inputs (the upper bit of the counter 2203 is used).

As described above, selection of the membership functions is completed when the signal MFSE is set at "L" level. There are the following three conditions to finish selecting the membership functions:

1. when an input value is smaller than a value corresponding to a vertex position of a selected membership function;
2. when the address of the selected membership function is 0, and the first input value is smaller than the value corresponding to the vertex position from the beginning, selection is ended at the address 1; and
3. when the address of the last membership function is selected.

Referring back to FIGS. 15A to 15N and FIG. 16, a timing for resetting an MFSE terminal will be described below.

When the signal MFSE is set at "L" level, a DF/F 2204 is set at "H" level and kept in this state until the count of a counter 2205 reaches three. When the count reaches three, a signal T1 goes "H", and the DF/F 2204 is reset. Selection of membership functions for the next input is started.

The selection timing of the next membership function will be described below. That is, the counter 2202 which has been disabled by the signal MFSE is reset by the signal T1, so that the signal MFSE goes "H". Selection of the membership function for the next input is started.

The counter 2203 counts the leading edges of the signals MFSE to select an input value and designate an upper address of the M.F.C. memory 2016.

An MDM terminal outputs an inverted signal of a clock only when the signal MFSE is set at "L" level. The inverted signal is used as a timing signal for calculating a membership value and storing data (to be described later). A signal CML is a timing signal for storing data conversion data for a membership value calculation. Only when the counter 2205 is set to be "0" and the signal MSFE signal is set at "L" level, the inverted signal of the clock is output. A signal MAL is a timing signal for storing a memory address of a selected if-part membership function.

The end of selection of membership functions for each input is performed by causing the counter 2203 to count the leading edges of the signals MFSE. Since two inputs are available in this case, the DF/F 2206 is set when the output of the counter 2203 represents 2, thereby initiating the center-of-gravity calculation cycle. If the number of inputs is three or more, an output from the counter 2203 is selected to cope with the increase in the number of inputs.

The center-of-gravity calculation timings can be realized by four cycles because since the number of inputs is two. More specifically, when the counter 2207 finishes counting pulses until four cycles, an output from the counter 2207 is output to reset the DF/F 2206. An output latch signal is generated by using a signal output when the output from the counter 2207 represents three. The output latching operation is performed by using a leading edge of the output latch signal. Outputs Q1 and Q2 of the counters 2207 are utilized as selecting signals for designating a then-part membership function.

A signal CGT is a timing signal of four cycles.

The output latch signal is also used as an input latch signal for the next inference cycle. When the center-of-gravity calculation is completed, the DF/F 2206 is reset, and the counters 2202 and 2203 which have been disabled are also released from the reset state, thereby starting an inference calculation for the next input.

As is apparent from the above description, the first inference result is output when the first latch signal is output.

Assume that the number of inputs is three or more, e.g., that the number of inputs is n. A center-of-gravity calculation can be achieved by $2^n$ cycles. An output from the counter 2207 is selected to set the number of CGT cycles to be $2^n$.

The number of cycles can be $2^n$ because the number of membership functions related to one input is two. When the number of inputs is n, the number of combinations of the rules is $2^n$.

Figure 17:
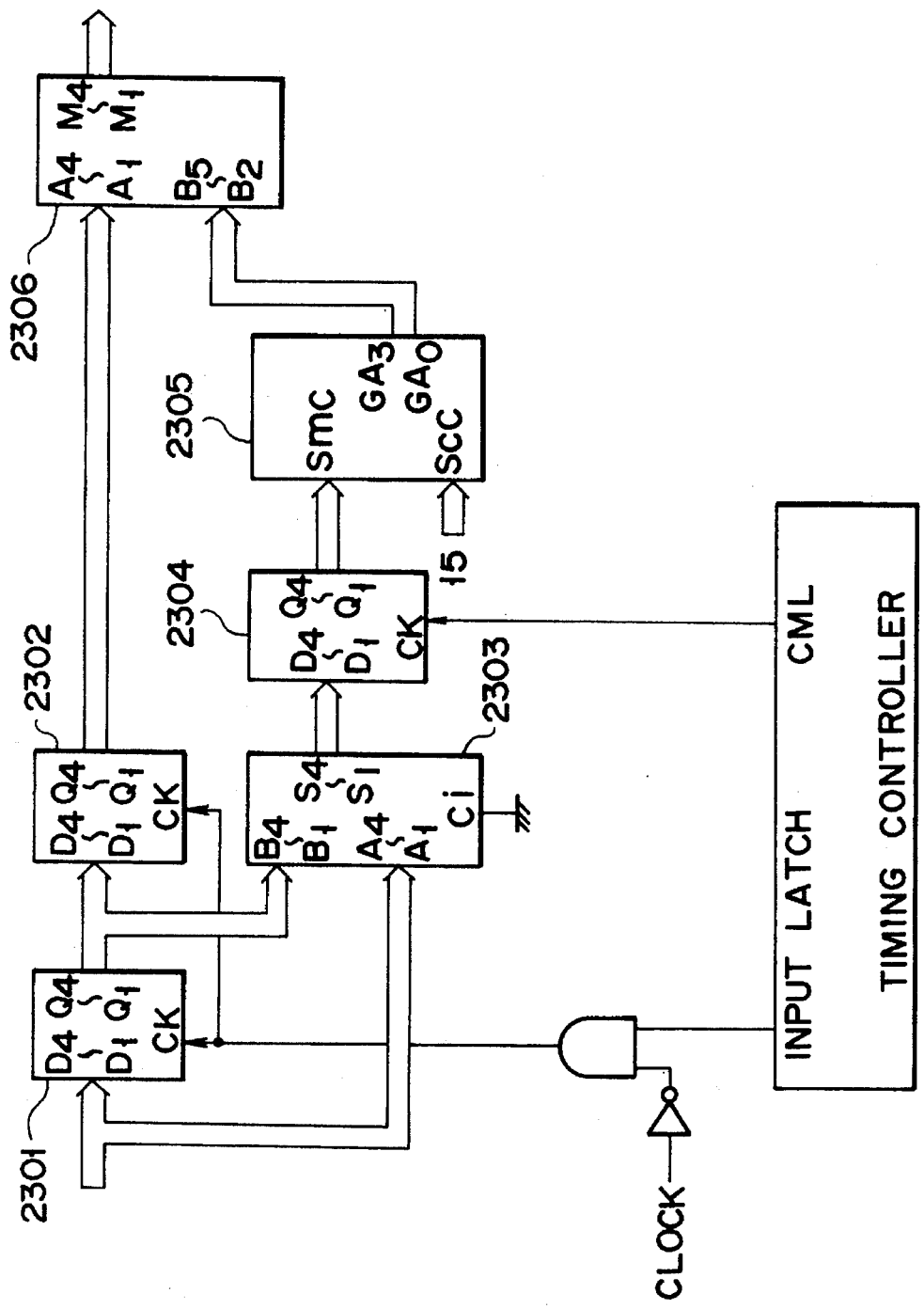
FIG. 17 is a detailed block diagram of an arrangement of a membership value calculation unit.

FIG. 17 shows a membership value calculation unit (corresponding to 12 in FIG. 8).

The absolute value of the difference between an input and a vertex position of a membership function serves as an input.

Latches 2301 and 2302 latch previous and present values, respectively. A full adder 2303 (FIG. 29) calculates a distance between the two selected membership functions by adding the previous and present values. Even when an input value is smaller than a value corresponding to the position of the first membership function and is larger than a value corresponding to the position of the last membership function, no problem is posed because an input is a distance between the input value and the membership function, which is then converted (to be described later). A data conversion method is not limited to the one described above, but can be a method applicable for a multi-input arrangement.

Data conversion is performed such that the size of a square is changeable according to the method described above. However, the square has a predetermined size. That is, an output from a latch 2304 is converted into 15. If the output from the latch 2304 is defined as M, a distance (e.g., xi' and xi") between an input and a membership function is multiplied with M/15.

This data conversion is performed such that the square has a side of 15.

Although the length of each side is given as 15, another value may be used.

An M/15 calculation is performed by a divider 2305 (FIG. 35) and a multiplier 2306 (FIG. 33). The inputs B1 and B8 to B6 of the multiplier 2306 receive "0"s, respectively.

A signal CML is output when selection of the membership functions is completed. When the signal CML is output, the value M/15 is determined and retained. At this moment, an output from the latch 2301 is a difference between the input and the position of the last selected membership function. An output from the latch 2302 is an immediately preceding difference.

Figure 18:
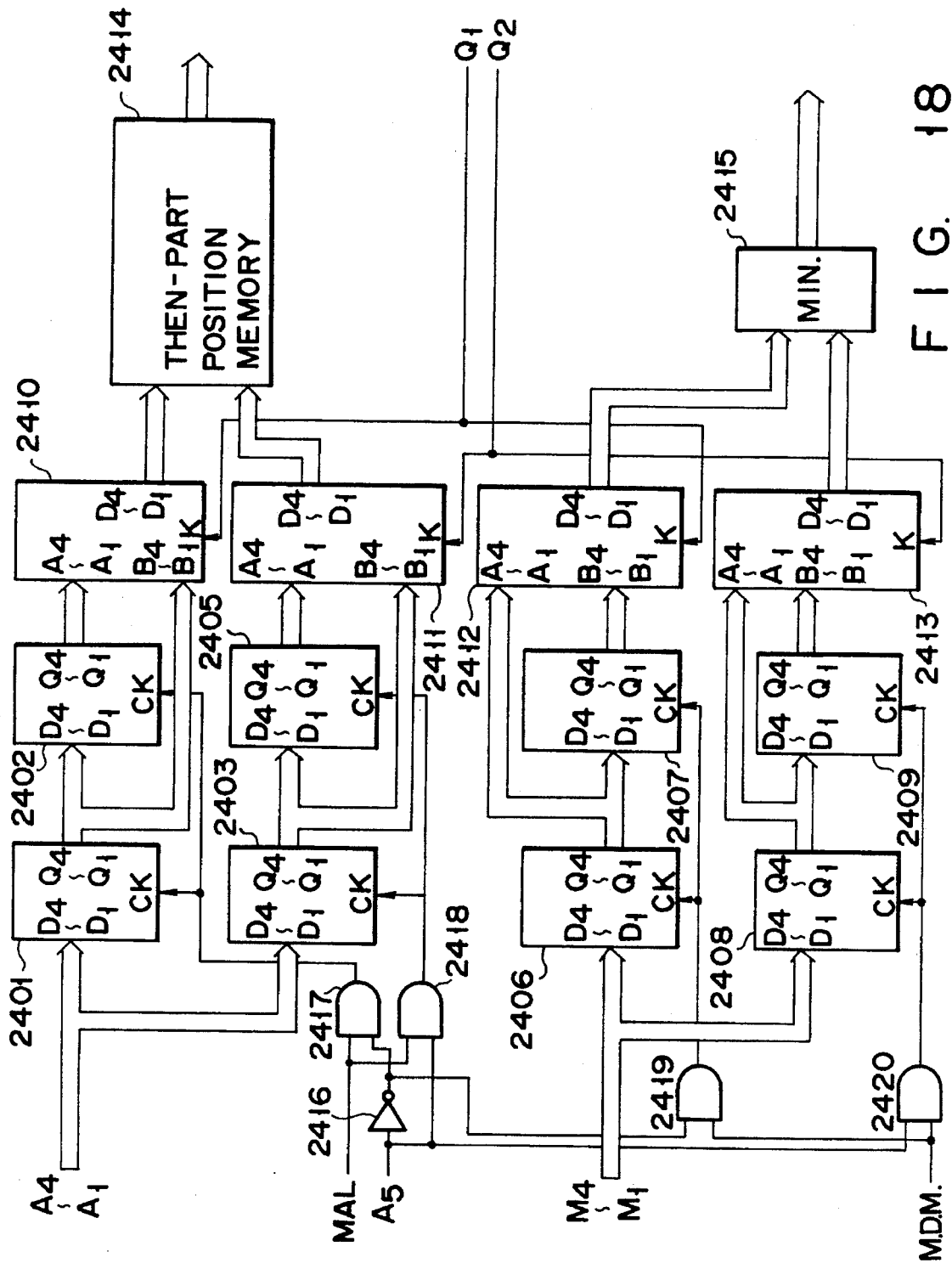
FIG. 18 is a detailed block diagram showing arrangements of a then-part selection unit and a MIN calculation unit.

FIG. 18 shows the then-part selector and the MIN calculation unit.

Upper latches 2401 to 2405 constitute a memory for storing an address of an if-part membership function selected to select a corresponding then-part membership function. If an input 1 is received, the latches 2401 and 2402 are sequentially selected by gates 2416 to 2418. This is selected by an address $A_5$ of a timing controller 2050. If an input 2 is received, the latches 2403 and 2405 are selected. When the number of inputs is three or more, an upper bit of the counter 2203 is used and the number of latch circuits is increased to cope with the increase in the number of inputs.

The last pulse of the signal MAL corresponding to each input is output at the end of selection of the corresponding if-part membership function. Addresses of right and left membership functions corresponding to an input value and stored in the M.F.C. memory 2016 are stored in the above latches.

The membership values (i.e. the values calculated by the circuit in FIG. 17) input to a MIN calculation circuit 2415 are also stored in latches 2406 to 2409 except for the following points. Since a value obtained upon data conversion is stored, as described with reference to FIG. 17, an MDM signal having the number of cycles larger than that of the signal MAL by two cycles is stored. If the number of inputs is three or more, it can be coped by the same method described above.

After all values are stored in the latches 2401 to 2405 and the latches 2406 to 2409 (i.e., selection of if-part membership functions for all inputs is completed), selection of then-part membership functions for all rules and MIN calculations are performed by changing the timings Q1 and Q2.

Then-part membership functions (position data in this case because these membership functions are singletons) are stored at addresses corresponding to memory address pairs of the if-part membership functions in a then-part position memory 2414 (corresponding to g(i,i) of the rule memory 10 in FIG. 8). Since the memory addresses of the if-part membership functions required for inference are already stored in the latches 2401 to 2405, all combinations are selected on the basis of the Q1 and Q2 signals from the timing controller under the control of selectors 2410 and 2411, so that then-part membership functions are sequentially output from the memory 2414. This corresponds to 13, 15 in FIG. 8.

Due to the data conversion by the data converter 17, a membership value relating to the membership function of the latch 2401 corresponds to the latch 2407, and a membership value of latch 2402 corresponds to the latch 2406. In this manner, the membership values are stored opposite in latch member. If selector inputs are set opposite to that described above, the addresses or timings Q1 and Q2 can be used to select membership values (corresponding to the inputs) of the if-part membership functions corresponding to the then-part membership functions. When a MIN value of the membership value selected by Q1 and Q2 is output, this output value is a MIN value of the membership value for a combination of the selected if-part membership functions.

The MIN values for all rules in response to the inputs and then-part membership functions corresponding to these rules are synchronously selected.

The MIN calculation circuit 2415 can be arranged utilizing FIGS. 24 and 26 of U.S. Ser. No. 426,576 (filing date: Oct. 24, 1989) filed by the present applicant.

Even if the number of inputs is three or more, it can be coped by the same method as described above.

Figure 19:
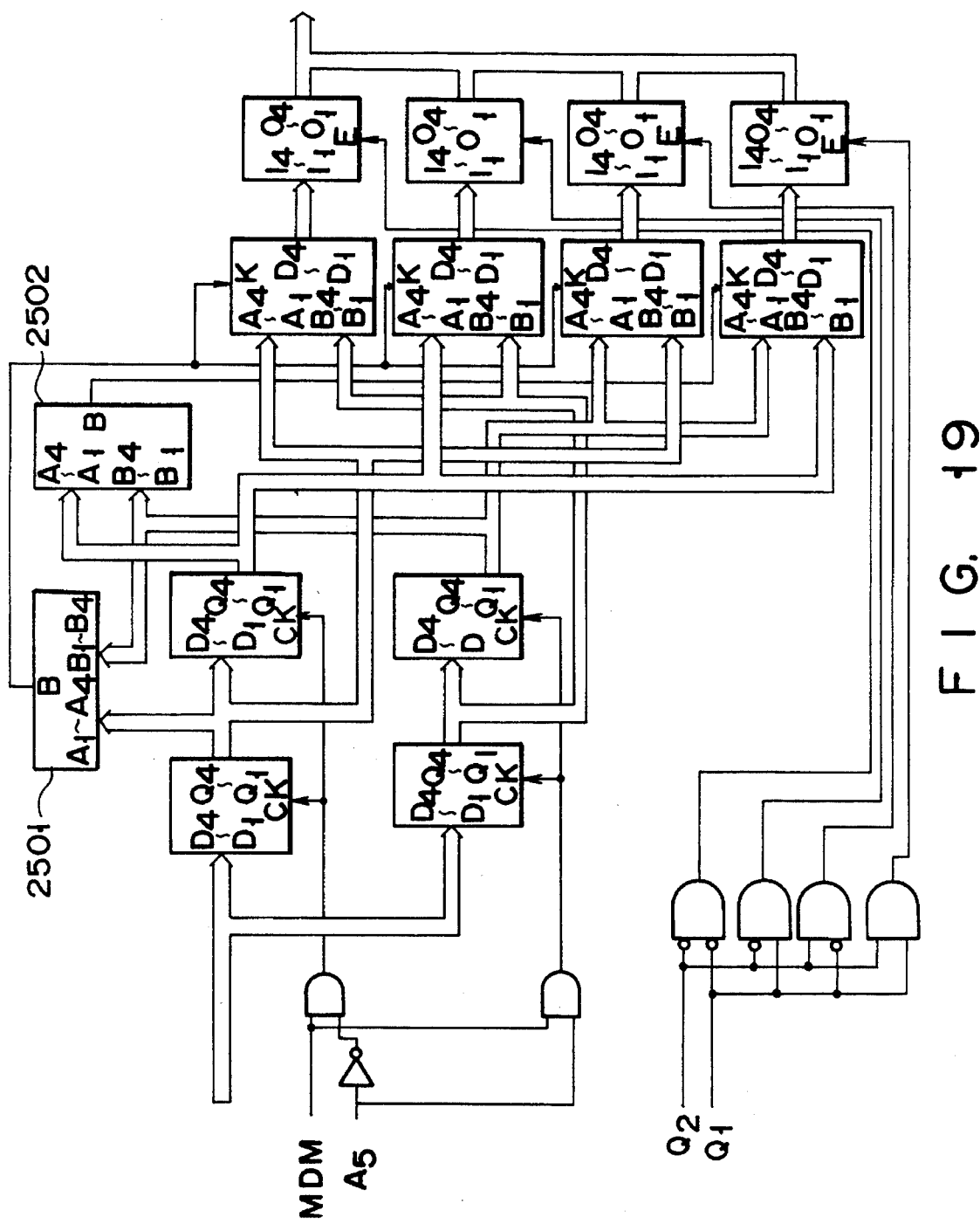
FIG. 19 is a detailed block diagram showing another arrangement of the MIN calculation unit shown in FIG. 18.

The MIN calculation unit can be modified as shown in FIG. 19. This corresponds to operations in steps #23 to #32 in the flow chart of FIG. 7B. A membership value memory is selected by B outputs from subtracters 2501 and 2502, and one of the rules is selected by Q1 and Q2 outputs. A tristate buffer (FIG. 26A) outputs a MIN value selected in units of rules.

FIG. 20 shows a center-of-gravity calculation unit (corresponding to 16 in FIG. 8).

The position of a then-part membership function for a selected rule is input to inputs A1 to A4 of a multiplier 2601, and a MIN value of the if-part membership function of the selected rule is input to inputs B1 to B4.

If the value of the then-part membership function is equal to D.C., the MIN value of the membership value is calculated as zero by the zero circuit in the comparator, as previously described. The D.C. may be a memory storage value or a fixed value.

An accumulating adder 2606 (FIG. 34) performs the addition Pp+Qq+Rr+Ss described above, and an accumulating adder 2603 performs the addition p+q+r+s described above. Adders 2602 and 2603 are reset when an INR is set at "L" level. The adders 2602 and 2603 start accumulation and addition from zero. The divider 2604 (FIG. 35) performs the center-of-gravity calculation in step #45 of the flow chart of FIG. 9.

The center-of-gravity calculation result is output every leading edge of the output latch signal from a latch 2605 having a reset function. An output from the latch 2605 having the reset function is kept zero when the signal ST is set at "H" level or until the first output latch signal is output.

The center-of-gravity calculation unit may be constituted by using a MAX circuit of the above U.S. Ser. No. 426,576 when the position of the then-part membership function is fixed.

Circuit blocks used in this circuit will be described below.

Figures 21A, 21B:
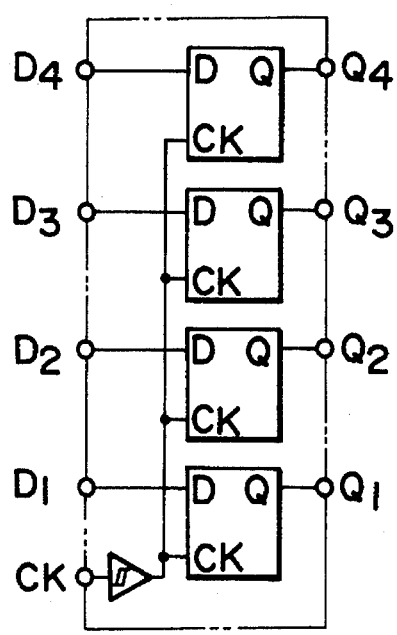
FIG. 21A is a detailed block diagram showing an arrangement of a latch circuit.
FIG. 21B is a table showing a relationship between clock signal states and outputs in FIG. 21A.

FIG. 21A shows a latch circuit. As shown in FIG. 21B, the latch circuit serves as a memory for latching the contents of D1 to D4 in Q1 to Q4 at the leading edge of a clock CK.

Figures 22A, 22B:
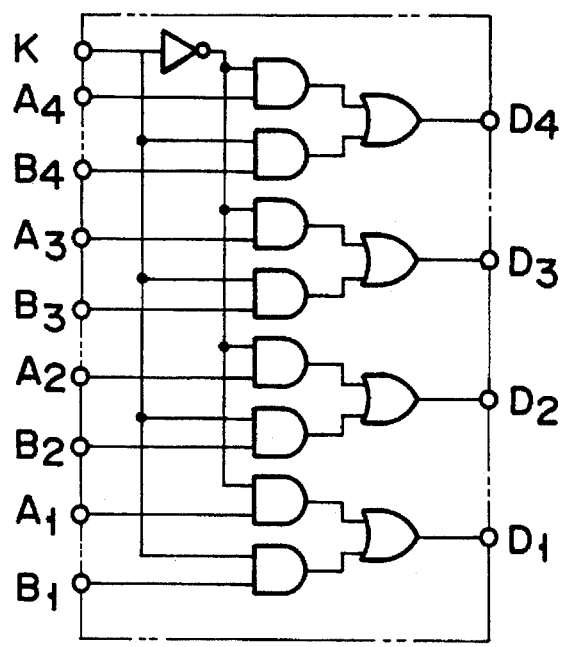
FIG. 22A is a detailed block diagram showing an arrangement of a selector.
FIG. 22B is a table showing a relationship between signal states of inputs K and outputs in FIG. 22A.

FIG. 22A shows a selector. As shown in FIG. 22B, when K is set at "L" level, A1 to A4 are output to B1 to B4. However, when K is set at "H", B1 to B4 are output to D1 to D4.

Figures 23A, 23B:
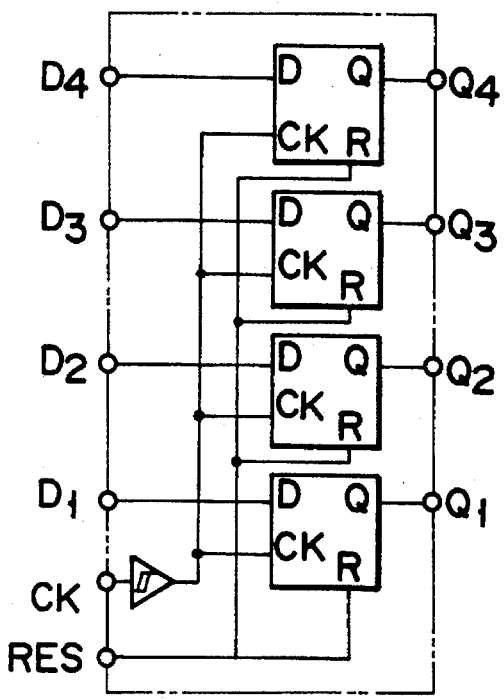
FIG. 23A is a detailed block diagram showing an arrangement of a latch having a reset function.
FIG. 23B is a table showing a relationship between reset terminal states and outputs in FIG. 23A.

FIG. 23A shows a latch having a reset function. This latch is obtained by adding a reset function to the latch circuit shown in FIG. 21A. As shown in FIG. 23B, when the reset terminal is kept at "H" level, outputs Q1 to Q4 are set at "L" level.

Figures 24A, 24B:
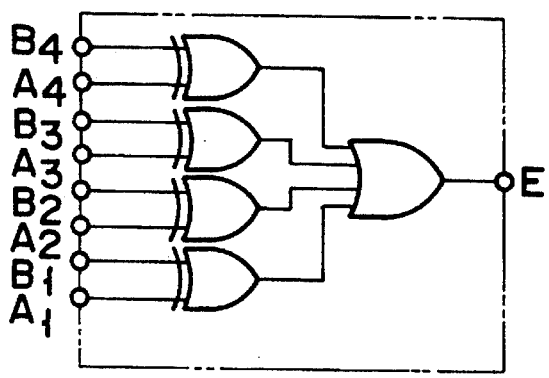
FIG. 24A is a detailed block diagram showing an arrangement of a comparator.
FIG. 24B is a table showing a relationship between inputs and outputs in FIG. 24A.

FIG. 24A shows a comparator. As shown in FIG. 24B, an output from the comparator is set at "L" level only when A1–A4=B1–B4.

FIG. 25A shows a counter which performs a count-up operation at a leading edge of a clock. As shown in FIG. 25B, when a terminal RES of the counter is set at "H" level, an output is set at "0", thereby disabling counting.

FIG. 26A shows a tristate buffer. As shown in FIG. 26B, when a terminal E of the tristate buffer is set at "H" level, the tristate buffer outputs a high-impedance output.

FIG. 27A shows a half adder, and its relationship between inputs and outputs is shown in FIG. 27B. FIG. 28A shows a full adder, and its relationship between inputs and outputs is shown in FIG. 28B. FIG. 29 shows a 4-bit full adder.

FIG. 30 shows a subtracter which performs a subtraction (A1-A4–B1-B4). The absolute value of the difference is output to S1 to S2. If the difference is negative, B is set at "L" level.

FIG. 31 shows a zero circuit. When a terminal Z of the zero circuit is set at "L" level, D4 to D1 are set at "0". When the terminal Z is set at "H" level, A4 to A1 are output.

Figure 32:
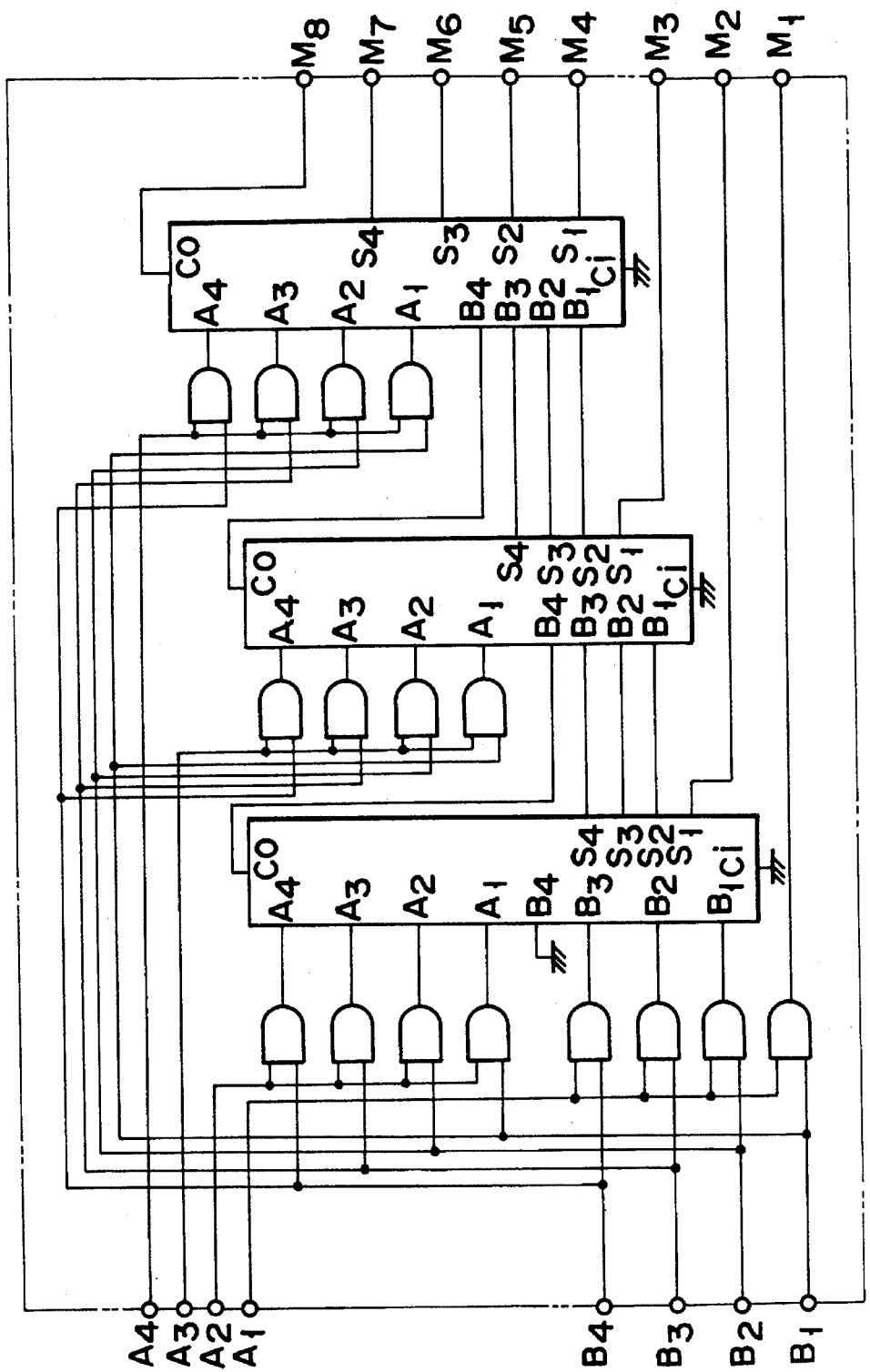
FIG. 32 is a detailed block diagram showing an arrangement of a multiplier.

FIG. 32 shows a multiplier which performs a multiplication A4-A1×B4-B1=M8-M1.

FIG. 33 shows a multiplier which performs a multiplication B8-B5 (integer) B4-B1 (decimal part)×A4-A1 (integer)=M4-M1 (integer). After the multiplication, the decimal part is rounded off.

FIG. 34 shows an accumulating adder having a reset function. This adder accumulates and adds input values until resetting in synchronism with the leading edge of a clock CK.

Figure 36:
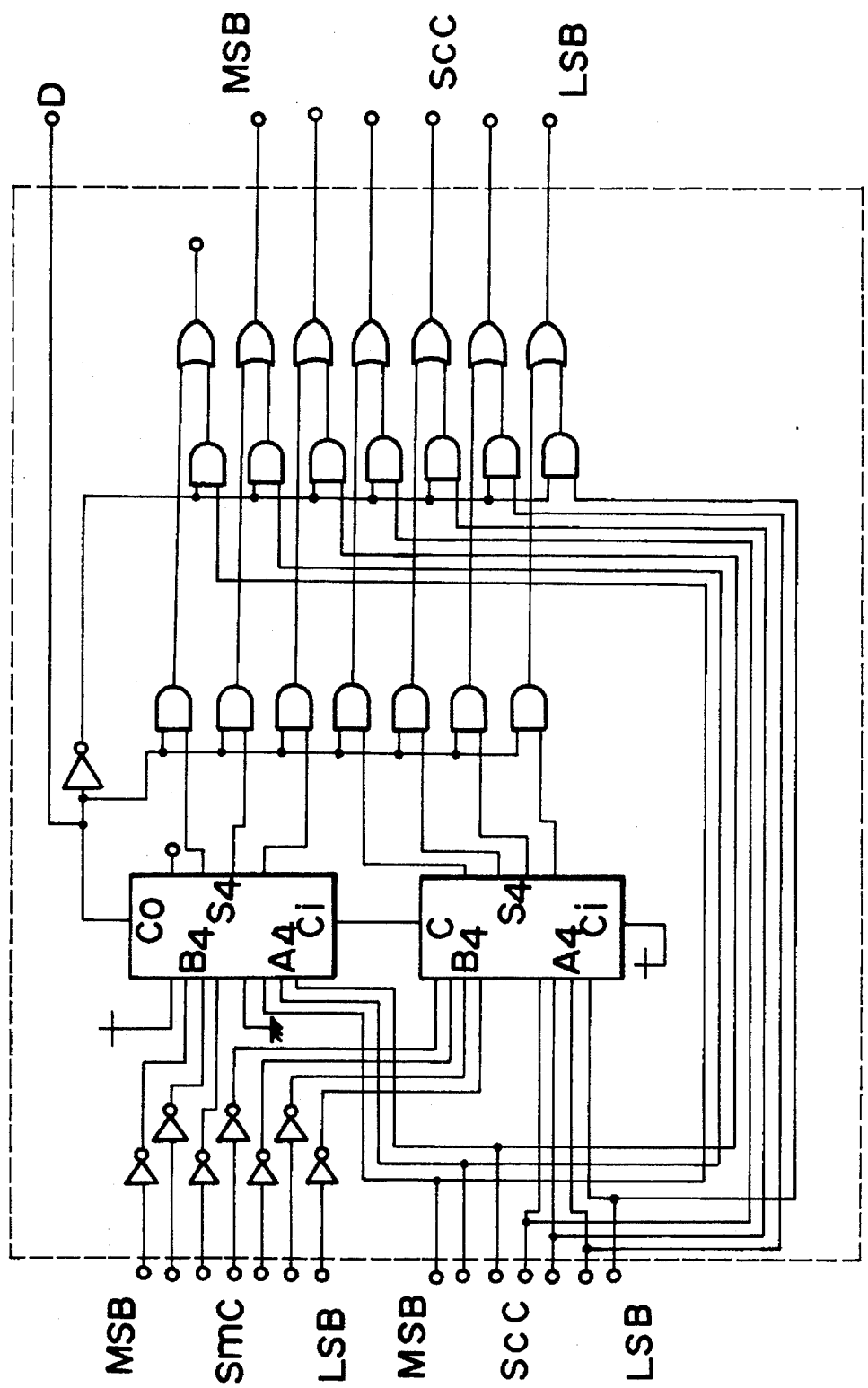
FIG. 36 is a detailed block diagram showing an arrangement of a subtracting multiplier.

FIG. 35 shows a divider, and FIG. 36 shows a subtracting multiplier. These circuits are described in detail in the above U.S. Ser. No. 426,576.

As has been described above, according to the present invention, there is provided a versatile fuzzy inference apparatus requiring a small amount of memory capacity, and having a simple arrangement and a high inference speed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A fuzzy inference apparatus comprising:

rule storing means for storing a plurality of then-part positions respectively corresponding to pairs each of which has one of a plurality of first if-part membership functions and one of a plurality of second if-part membership functions, the plurality of first and second if-part membership functions having shapes of triangles each having a base corresponding to positions of vertices of triangles of two adjacent membership functions, said rule storing means storing the positions of the vertices of the triangles in correspondence with the pairs of first and second if-part membership functions;

rule selecting means for sequentially comparing an input value to the plurality of first if-part membership functions with positions of a plurality of vertices representing the plurality of first if-part membership functions stored in said rule storing means, retrieving two adjacent vertex positions between which a position of the input value is located, calculating first and second differences between the retrieved two vertex positions and the input value, sequentially comparing an input value to the plurality of second if-part membership functions with positions of a plurality of vertices representing the plurality of second if-part membership functions stored in said rule storing means, retrieving two adjacent vertex positions between which a position of the input value is located, and calculating third and fourth differences between the retrieved two vertex positions and the input value;

membership value selecting means for selecting a minimum value of each rule on the basis of magnitudes of the first to fourth differences obtained by said rule selecting means;

membership value storing means for storing the minimum value selected by said membership value selecting means;

then-part selecting means for selecting then-part positions respectively corresponding to the two vertex positions corresponding to the plurality of first if-part membership functions stored in said rule storing means and selected by said rule selecting means and the two vertex positions corresponding to the plurality of second if-part membership functions stored in said rule storing means and selected by said rule selecting means;

then-part position storing means for storing the then-part positions selected by said then-part selecting means; and center-of-gravity calculating means for calculating a position of a center of gravity on the basis of the minimum values stored in said membership value storing means and the then-part positions stored in said then-part position storing means.

2. An apparatus according to claim 1, wherein the first and second membership functions have identical triangular shapes.

3. An apparatus according to claim 1, wherein the first and second membership functions have different triangular shapes, and further comprising data converting means for converting the plurality of minimum values obtained by said membership value selecting means.

4. An apparatus according to claim 1, wherein said center-of-gravity calculating means calculates the position of the center of gravity by $$G=(P \cdot p+Q \cdot q+R \cdot r+S \cdot s)/(p+q+r+s)$$

where p, q, r, and s are the minimum values calculated by said membership value selecting means, and P, Q, R, and S are the then-part positions.

5. A 2-input fuzzy inference apparatus having two if-parts corresponding to first and second inputs, each of the if-parts having a membership function defined by one vertex position and a straight line, comprising:

an if-part membership function position memory for storing the vertex position data of the if-part membership functions respectively corresponding to the first and second inputs;

a then-part membership function position memory for storing position data of then-part membership functions corresponding to the if-part vertex position data respectively corresponding to the first and second inputs on the basis of inference rules;

a first selector for selecting, from said if-part membership function position memory, the vertex position data at positions interposing the first input, on the basis of the inference rules;

a second selector for selecting, from said if-part membership function position memory, the vertex position data at positions interposing the second input, on the basis of the inference rules;

a third selector for selecting, from said then-part membership function position memory, position data of then-part membership functions corresponding to the vertex position data selected by said first and second selectors;

a first calculation unit for calculating membership values of the membership functions for the first input as absolute values of differences between the first input and the vertex position data selected by the first selector;

a second calculation unit for calculating membership values of the membership functions for the second input as absolute values of differences between the second input and the vertex position data selected by the second selector;

a minimum value calculation unit for obtaining values corresponding to minimum values corresponding to the inference rules on the basis of outputs from said first calculation unit and outputs from said second calculation unit; and an output calculation unit for calculating inference outputs for the inference rules in accordance with position data of the then-part membership functions selected by said third selector and output values from said minimum value calculation unit.

6. An apparatus according to claim 5, wherein said minimum value calculation unit compares the output values from said first calculation unit with the output values from said second calculation unit and outputs one of the output values from said first calculation unit or the output values from said second calculation unit as a value corresponding to the minimum value complying with the inference rule in accordance with comparison results.

7. A fuzzy inference apparatus in which an if-part membership function has a shape of a triangle, and a base of the triangle extends up to vertex positions of adjacent if-part membership functions, comprising:

if-part membership storing means for storing vertex positions of the if-part membership functions;

if-part membership function selecting means for selecting the if-part membership function corresponding to input data;

minimum value calculating means for calculating a minimum value of an in-part membership function value by using the selected if-part membership function and the input data;

then-part membership function storing means for storing position data of then-part membership functions on the basis of addresses of the if-part membership functions;

then-part membership selecting means for selecting the position data of the then-part membership function on the basis of the address of the selected if-part membership function; and center-of-gravity calculating means for calculating a center of gravity on the basis of the selected position data and an output from said minimum value calculating means, wherein said if-part membership function selecting means comprises:

a vertex position output circuit for sequentially reading and outputting the vertex positions stored in said if-part membership function storing means in response to rule designation address signals;

a subtractor for calculating differences between the output vertex positions and the input data, said subtractor being arranged to output absolute values of the differences and a borrow signal when a sign of the difference is inverted;

a stop circuit for stopping outputting the vertex positions from the vertex position output circuit when the borrow signal is output from said subtractor; and a memory circuit for storing a present absolute value output and a previous absolute value output from said subtractor when said stop circuit stops outputting the vertex positions, the values stored in said memory circuit being values corresponding to if-part membership function values.

8. An apparatus according to claim 7, wherein said then-part membership function selecting means comprises:

a memory circuit for storing rule designation address signals corresponding to the vertex positions representing the if-part membership functions selected by said if-part membership function selecting means; and readout means for reading out, from said then-part membership function storing means, the then-part positions in response to the address signals stored in said memory circuit while said minimum value calculating means performs a minimum value calculating operation.

9. A multi-input fuzzy inference apparatus having a plurality of if-parts corresponding to a plurality of inputs, each of the plurality of if-parts having a membership function defined by one vertex position and a straight line, comprising:

an if-part membership function position memory circuit for storing the plurality of vertex position data of each if-part membership function corresponding to each input;

a then-part membership function position memory circuit for storing a plurality of position data of a then-part membership function corresponding to the plurality of vertex position data of the if-part membership function for each input on the basis of inference rules;

a first selector circuit for sequentially comparing each input with the vertex position data stored in said if-part membership function position memory circuit and selecting the vertex position data at positions interposing each input;

a second selector circuit for selecting, from said then-part membership function position memory circuit, position data of a then-part membership function corresponding to the plurality of vertex position data selected by said first selector circuit;

a grade calculation circuit for calculating grades of the membership functions for each input as absolute values of differences between each input and the plurality of the vertex position data selected by said first selector circuit;

a minimum value calculating circuit for obtaining values corresponding to minimum values corresponding to the inference rules on the basis of outputs from said grade calculation circuit;

a center-of-gravity calculation circuit for calculating a center of gravity as an inference output in accordance with the then-part membership function position data selected by said second selector circuit and outputs from said minimum value calculation circuit; and a switching signal generator for switching between said grade calculation circuit and a set of said first and second selector circuits in correspondence with each input.

10. An apparatus according to claim 9, wherein said grade calculation circuit comprises a multiplier/divider circuit for normalizing absolute values of differences between each input and the plurality of vertex position data selected by said first selector circuit.

11. A fuzzy inference apparatus comprising:

rule storing means for storing a plurality of then-part positions respectively corresponding to pairs each of which has one of a plurality of first if-part membership functions and one of a plurality of second if-part membership functions, the plurality of first and second if-part membership functions having shapes of triangles each having a base corresponding to positions of vertices of triangles of two adjacent membership functions, said rule storing means storing the positions of the vertices of the triangles in correspondence with the plurality of first and second if-part membership functions;

rule selecting means for sequentially comparing an input value to the plurality of first if-part membership functions with positions of a plurality of vertices of the plurality of first if-part membership functions stored in said rule storing means, retrieving two adjacent vertex positions between which a position of the input value is located, calculating first and second differences between the retrieved two vertex positions and the input value, sequentially comparing an input value to the plurality of second if-part membership functions with positions of a plurality of vertices representing the plurality of second if-part membership functions stored in said rule storing means, retrieving two adjacent vertex positions between which a position of the input value is located, and calculating third and fourth differences between the retrieved two vertex positions and the input value;

membership value selecting means for selecting a minimum value of each rule on the basis of magnitudes of the first to fourth differences obtained by said rule selecting means;

membership value storing means for storing the minimum value selected by said membership value selecting means;

then-part selecting means for selecting then-part positions respectively corresponding to the two vertex positions corresponding to the plurality of first if-part membership functions stored in said rule storing means and selected by said rule selecting means and the two vertex positions corresponding to the plurality of second if-part membership functions stored in said rule storing means and selected by said rule selecting means;

then-part position storing means for storing the then-part positions selected by said then-part selecting means; and center-of-gravity calculating means for calculating a position of a center of gravity on the basis of the minimum values stored in said membership value storing means and the then-part positions stored in said then-part position storing means.

12. An apparatus according to claim 11, wherein the first and second membership functions have identical triangular shapes.

13. An apparatus according to claim 11, wherein the first and second membership functions have different triangular shapes, and further comprising data converting means for converting the plurality of minimum values obtained by said membership value calculating means.

14. An apparatus according to claim 11, wherein said center-of-gravity calculating means calculates the position of the center of gravity by $$G=(P \cdot p + Q \cdot q + R \cdot r + S \cdot s)/(p+q+r+s)$$

where p, q, r, and s are the minimum values calculated by said membership value calculating means, and P, Q, R, and S are the then-part positions.

* * * * *